US009852006B2

(12) United States Patent
Akopyan et al.

(10) Patent No.: US 9,852,006 B2
(45) Date of Patent: Dec. 26, 2017

(54) CONSOLIDATING MULTIPLE NEUROSYNAPTIC CORE CIRCUITS INTO ONE RECONFIGURABLE MEMORY BLOCK MAINTAINING NEURONAL INFORMATION FOR THE CORE CIRCUITS

(71) Applicant: INTERNATIONAL BUSINESS MACHINES CORPORATION, Armonk, NY (US)

(72) Inventors: Filipp A. Akopyan, New Windsor, NY (US); Rodrigo Alvarez-Icaza Rivera, San Jose, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 14/229,760

(22) Filed: Mar. 28, 2014

(65) Prior Publication Data

US 2016/0321537 A1 Nov. 3, 2016

(51) Int. Cl.
*G06N 3/06* (2006.01)
*G06F 9/50* (2006.01)
(Continued)

(52) U.S. Cl.
CPC ............... *G06F 9/50* (2013.01); *G06N 3/049* (2013.01); *G06N 3/063* (2013.01)

(58) Field of Classification Search
None
See application file for complete search history.

(56) References Cited

U.S. PATENT DOCUMENTS 5,636,327 A * 6/1997 Nakahira ........... G06K 9/00986
382/157
5,701,397 A 12/1997 Steimle et al.
(Continued)

FOREIGN PATENT DOCUMENTS

CN 101639901 A 2/2011
CN 102193518 A 9/2011
(Continued)

OTHER PUBLICATIONS

Yudanov, D. et al. (2010). "GPU-based simulation of spiking neural networks with real-time performance & high accuracy." The 2010 International Joint Conference on Neural Networks (IJCNN). IEEE. 8 pages. DOI: 10.1109/IJCNN.2010.5596334.*

(Continued)

*Primary Examiner* — Stanley K Hill
*Assistant Examiner* — Benjamin Buss
(74) *Attorney, Agent, or Firm* — Sherman IP LLP; Kenneth L. Sherman; Hemavathy Perumal

(57) ABSTRACT

Embodiments of the invention relate to a neural network circuit comprising a memory block for maintaining neuronal data for multiple neurons, a scheduler for maintaining incoming firing events targeting the neurons, and a computational logic unit for updating the neuronal data for the neurons by processing the firing events. The network circuit further comprises at least one permutation logic unit enabling data exchange between the computational logic unit and at least one of the memory block and the scheduler. The network circuit further comprises a controller for controlling the computational logic unit, the memory block, the scheduler, and each permutation logic unit.

20 Claims, 16 Drawing Sheets

(51) Int. Cl.
G06N 3/04 (2006.01)
G06N 3/063 (2006.01)

(56) References Cited

U.S. PATENT DOCUMENTS

| | | | |
|---|---|---|---|
| 5,819,245 | A | 10/1998 | Peterson et al. |
| 6,999,953 | B2 | 2/2006 | Ovhsinsky et al. |
| 7,043,466 | B2 | 5/2006 | Watanabe et al. |
| 7,457,787 | B1 | 11/2008 | Furber |
| 7,533,071 | B2 | 5/2009 | Snook et al. |
| 8,285,657 | B2 | 10/2012 | Edelman et al. |
| 8,606,732 | B2 | 12/2013 | Venkatraman et al. |
| 8,626,684 | B2 | 1/2014 | Modha |
| 8,655,813 | B2 | 2/2014 | Ananthanarayanan et al. |
| 8,682,822 | B2 | 3/2014 | Modha et al. |
| 8,699,566 | B2 | 4/2014 | Ananthanarayanan et al. |
| 8,712,940 | B2 | 4/2014 | Modha |
| 8,738,554 | B2 | 5/2014 | Modha |
| 8,799,199 | B2 | 8/2014 | Modha |
| 8,812,414 | B2 | 8/2014 | Arthur et al. |
| 8,812,415 | B2 | 8/2014 | Modha |
| 8,843,425 | B2 | 9/2014 | Modha |
| 8,856,055 | B2 | 10/2014 | Brezzo et al. |
| 8,868,477 | B2 | 10/2014 | Esser et al. |
| 8,874,498 | B2 | 10/2014 | Modha |
| 2007/0011118 | A1* | 1/2007 | Snook .................. G06F 15/7867 706/16 |
| 2008/0300841 | A1* | 12/2008 | Visel ..................... G06F 17/271 703/11 |
| 2010/0241601 | A1 | 9/2010 | Carson et al. |
| 2011/0161625 | A1 | 6/2011 | Pechanek |
| 2011/0167245 | A1 | 7/2011 | Lavrov et al. |
| 2013/0073495 | A1* | 3/2013 | Izhikevich ............. G06N 3/063 706/25 |
| 2013/0073497 | A1* | 3/2013 | Akopyan ............... G06N 3/049 706/27 |
| 2013/0151793 | A1 | 6/2013 | Rudosky et al. |
| 2014/0046885 | A1* | 2/2014 | Majumdar .............. G06N 3/02 706/22 |
| 2014/0222740 | A1 | 8/2014 | Alvarez-Icaza Rivera et al. |
| 2015/0254551 | A1 | 9/2015 | Alvarez-Icaza Rivera et al. |
| 2015/0379393 | A1 | 12/2015 | Alvarez-Icaza Rivera et al. |

FOREIGN PATENT DOCUMENTS

| | | |
|---|---|---|
| CN | 102663497 A | 9/2012 |
| CN | 102667826 A | 9/2012 |
| CN | 104145281 A | 11/2014 |
| JP | 6139217 A | 5/1994 |
| WO | 2012055593 A1 | 5/2012 |
| WO | 2013043903 A1 | 3/2013 |

OTHER PUBLICATIONS

Amir, A. et al. (Aug. 2013). "Cognitive Computing Programming Paradigm: A Corelet Language for Composing Networks of Neurosynaptic Cores". 10 pages.*
Rast, A.D. et al. (2008). "Virtual Synaptic Interconnect Using an Asynchronous Network-on-Chip". 2008 International Joint Conference on Neural Networks (IJCNN 2008). IEEE. pp. 2727-2734.*
Moradi, S. et al. (Published Jun. 4, 2013). "An Event-Based Neural Network Architecture With an Asynchronous Programmable Synaptic Memory". IEEE Transactions on Biomedical Circuits and Systems, vol. 8, No. 1, Feb. 2014. pp. 98-107. DOI: 10.1109/TBCAS.2013.2255873.*
U.S. Notice of Allowance for U.S. Appl. No. 13/619,433 dated Jun. 9, 2015.
Strand, D., "OVONICS: From Science to Products", Journal of Optoelectronics and Advanced Materials, Aug. 2005, pp. 1679-1690, vol. 7, No. 4, JOAM, Romania.
Iyer, S.S. et al., "Embedded DRAM: Technology Platform for the Blue Gene/L Chip", IBM Journal of Research and Development, Mar. 2005, pp. 333-350, vol. 49, No. 2/3, IBM, USA.
Furber, S.B., "A Fascicle Impulse-Rate Encoded (FIRE) Neural Architecture", Oct. 2000, pp. 1-7, USA.
International Search Report and Written Opinion dated Feb. 6, 2014 for International PCT Application No. PCT/IB2013/056734 from the State Intellectual Property Office, the P.R. China, pp. 1-10, Beijing, China.
International Search Report and Written Opinion dated Jan. 2, 2014 for International PCT Application No. PCT/IBM2013/055312 from the State Intellectual Property Office, the P.R. China, pp. 107, Beijing, China.
Pourhaj, P. et al., "FPGA Based Pipelined Architecture for Action Potential Simulation in Biological Neural Systems", Proceedings of the 23rcd Canadian Conference on Electrical and Computer Engineering (CCECE), May 2-5, 2010, pp. 1-4, IEEE, United States.
Ago, Y. et al., "The Parallel FDFM Processor Core Approach for Neural Networks", Proceedings of the 2011 Second International Conference on Networking and Computing, Nov. 30, 2011-Dec. 2, 2011, pp. 113-119, IEEE, United States.
Arthur, J.V. et al., "Building Block of a Programmable Neuromorphic Sustrate: A Digital Neurosynaptic Core", Proceedings of the 2012 International Joint Conference on Neural Networks (IJCNN), Jun. 10-15, 2012, pp. 1-8, IEEE, United States.
U.S. Notice of Allowance for U.S. Appl. No. 13/683,234 dated Nov. 14, 2014.
U.S. Non-Final Office Action for U.S. Appl. No. 13/619,433 dated Nov. 19, 2014.
Cattell, R. et al., "Challenges for Brain Emulation: Why is Building a Brain so Difficult?", Nat. Intell 1.3 (012) 17-31, Feb. 5, 2012, pp. 1-28, United States.
Imam, N. et al., "A Digital Neurosynaptic Core Using Event-Driven QDI Circuits", In the Proceedings of the 2012 IEEE 18th International Symposium on Asynchronous Circuits and Systems, May 7-9, 2012, pp. 25-32, IEEE Computer Society, United States.
Merolla, P. et al., "A Digital Neurosynaptic Core Using Embedded Crossbar Memory with 45pJ per Spike in 45nm", In the Proceedings of the 2011 Custom Integrated Circuits Conference (CICC), Sep. 19-21, 2011, pp. 1-4, IEEE Xplore, United States.
Preissl, R. et al., "Compass: A scalable simulator for an architecture for Cognitive Computing", In the Proceedings of the 2012 International Conference on High Performance Computing, Networking, Storage and Analysis (SC) Article No. 54, Nov. 10-16, 2012, pp. 1-11, IEEE Xplore, United States.
Patterson, C., "Scalable communications for a million-core neural processing architecture", Journal of Parallel and Distributed Computing, Feb. 4, 2012, pp. 1507-1520, vol. 72, Issue 11, Elsevier, United States.

* cited by examiner

CONSOLIDATING MULTIPLE NEUROSYNAPTIC CORE CIRCUITS INTO ONE RECONFIGURABLE MEMORY BLOCK MAINTAINING NEURONAL INFORMATION FOR THE CORE CIRCUITS

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation and in particular, consolidating multiple neurosynaptic core circuits into one reconfigurable memory block.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment provides a neural network circuit comprising a memory block for maintaining neuronal data for multiple neurons, a scheduler for maintaining incoming firing events targeting the neurons, and a computational logic unit for updating the neuronal data for the neurons by processing the firing events. The network circuit further comprises at least one permutation logic unit enabling data exchange between the computational logic unit and at least one of the memory block and the scheduler. The network circuit further comprises a controller for controlling the computational logic unit, the memory block, the scheduler, and each permutation logic unit.

Another embodiment provides a method for consolidating neuronal data for multiple neurons. The method comprises maintaining neuronal data for multiple neurons in a memory block, maintaining incoming firing events targeting the neurons in a scheduler, and updating the neuronal data for the neurons by processing the incoming firing events via a computational logic unit. At least one permutation logic unit is used to exchange data between the computational logic unit and at least one of the memory block and the scheduler.

The method further comprises controlling the computational logic unit, the memory block, the scheduler, and each permutation logic unit.

These and other features, aspects and advantages of the present invention will become understood with reference to the following description, appended claims and accompanying figures.

DETAILED DESCRIPTION

Embodiments of the invention relate to neuromorphic and synaptronic computation and in particular, consolidating multiple neurosynaptic core circuits into one reconfigurable memory block. The memory block maintains neuronal data for neurons of the core circuits. Different types of neuronal data, such as synaptic connectivity information, neuron parameters, and neuronal states, may be mapped to different locations of the memory block, and/or allocated different amounts of memory from the memory block.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

Figure 1:
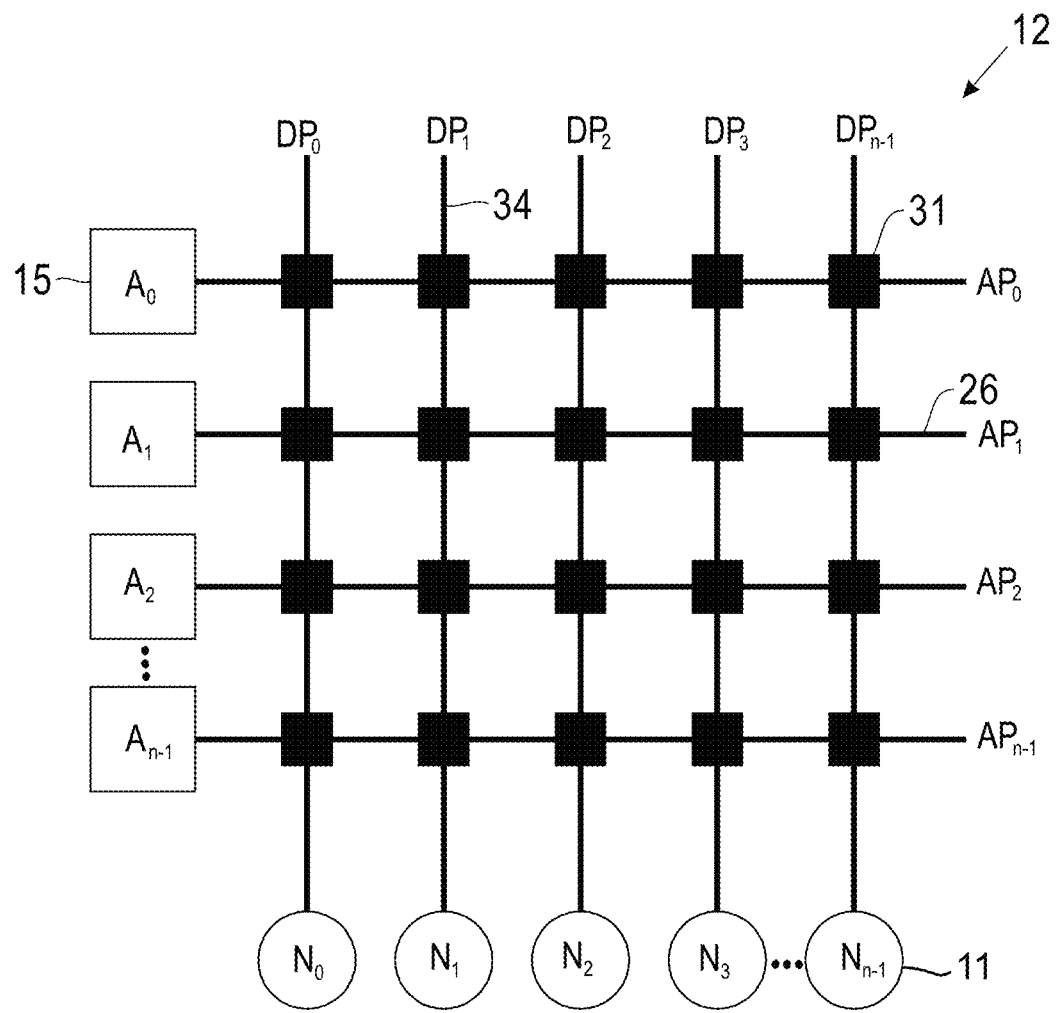
FIG. 1 illustrates a neurosynaptic core circuit, in accordance with an embodiment of the invention.

FIG. 1 illustrates a neurosynaptic core circuit ("core circuit") 10, in accordance with an embodiment of the invention. The core circuit 10 comprises multiple electronic axons ("axons") 15, such as axons $A_0, A_1, A_2, \ldots,$ and $A_{n-1}$. The core circuit 10 further comprises multiple electronic neurons ("neurons") 11, such as neurons $N_0, N_1, N_2, \ldots,$ and $N_{n-1}$. Each neuron 11 has configurable operational parameters. The core circuit 10 further comprises a synaptic crossbar 12 including multiple electronic synapse devices ("synapses") 31, multiple rows/axon paths 26, and multiple columns/dendrite paths 34.

Each synapse 31 gates spike events (i.e., neuronal firing events) traveling from an axon 15 to a neuron 11. Each axon 15 is connected to a corresponding axon path 26 of the crossbar 12. For example, axon $A_0$ sends spike events to a corresponding axon path $AP_0$. Each neuron 11 is connected to a corresponding dendrite path 34 of the crossbar 12. For example, neuron $N_0$ receives incoming spike events from a corresponding dendrite path $DP_0$. Each synapse 31 is located at an intersection between an axon path 26 and a dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 has a synaptic weight. The synaptic weights of the synapses 31 of the core circuit 10 may be represented by a weight matrix W, wherein an element $W_{ij}$ of the matrix W represents a synaptic weight of a synapse 31 located at a row/axon path i and a column/dendrite path j of the crossbar 12. In one embodiment, the synapses 31 are binary memory devices. Each synapse 31 can have either a weight "0" or a weight "1". In one embodiment, a synapse 31 with a weight "0" indicates that said synapse 31 is non-conducting. In another embodiment, a synapse 31 with a weight "0" indicates that said synapse 31 is not connected. In one embodiment, a synapse 31 with a weight "1" indicates that said synapse 31 is conducting. In another embodiment, a synapse 31 with a weight "1" indicates that said synapse 31 is connected. A learning rule such as spike-timing dependent plasticity (STDP) may be applied to update the synaptic weights of the synapses 31.

In response to the incoming spike events received, each neuron 11 generates an outgoing spike event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

Although certain illustrative embodiments of the invention are described herein using synapses comprising electronic circuits, the present invention is not limited to electronic circuits.

Figure 2:
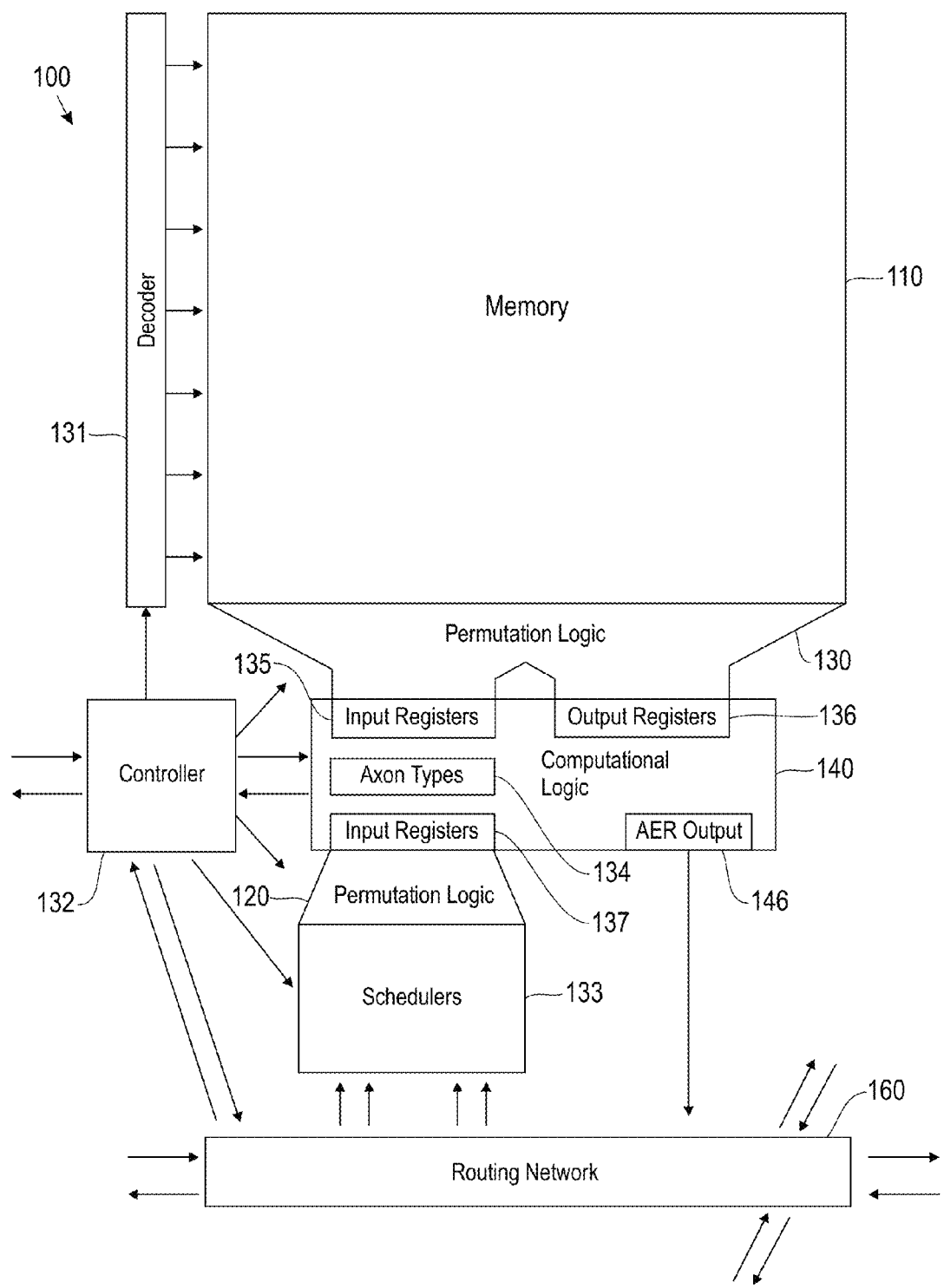
FIG. 2 illustrates an example reconfigurable neurosynaptic network circuit, in accordance with an embodiment of the invention.

FIG. 2 illustrates an example reconfigurable neurosynaptic network circuit 100, in accordance with an embodiment of the invention. The network circuit 100 comprises a single reconfigurable memory block 110. The network circuit 100 may be configured to represent one or more core circuits 10 by consolidating data for the core circuits 10 into the memory block 110. In one embodiment, the memory block 110 maintains neuronal data for neurons 11 of one or more core circuits 10. The number of core circuits 10 represented by the network circuit 100 is variable.

In one embodiment, the neuronal data maintained within the memory block 110 includes synaptic connectivity information, neuron parameters, and neuronal states for the neurons 11. For each neuron 11, the synaptic connectivity information comprises corresponding synaptic weights representing synaptic connections between the neuron 11 and incoming axons 15 of the neuron 11. Let $W_{ij}$ generally denote a synaptic weight for a synaptic connection between a neuron i and an incoming axon j. For each neuron 11, the neuron parameters comprise one or more corresponding neuron parameters for the neuron 11. In one embodiment, neurons parameters maintained for a neuron 11 include a leak rate parameter and a threshold parameter. Let $Lk_i$ generally denote a leak rate parameter for a neuron i. Let $Th_i$ generally denote a threshold parameter for a neuron i. For each neuron 11, the neuronal states comprises a corresponding neuronal state for the neuron 11. In one embodiment, a neuronal state of a neuron 11 comprises a membrane potential variable. Let $Vm_i$ generally denote a membrane potential variable for a neuron i.

The mapping of the synaptic connectivity information, the neuron parameters, and/or the neuronal states to the memory block 110 is configurable. The synaptic connectivity information, the neuron parameters, and the neuronal states may be maintained in different locations of the memory block 110. The amount of memory from the memory block 110 allocated to the synaptic connectivity information, the neuron parameters, and/or the neuronal states is also configurable. The ability to reconfigure the memory block 110 enables features and behaviors such as multi-bit synapses, multiple axon targets per neuron, on-chip learning, floating point math, look-up table neurons, neurons with more or less synapses, and efficient convolutions. Further, the ability to reconfigure the memory block 110 facilitates improved hardware resource utilization.

The network circuit 100 further comprises a controller unit ("controller") 132, a computational logic unit 140, a scheduler unit ("scheduler") 133, a decoder unit ("decoder") 131, a first permutation logic unit 130, and a second permutation logic unit 120. The network circuit 100 interacts with a routing network 160 that routes and delivers spike events between multiple network circuits 100. In one embodiment, the neuronal data maintained within the memory block 110 includes spike destination information for the neurons 11. The routing network 160 routes and delivers each spike event generated by each neuron based on corresponding spike destination information maintained for the neuron.

In one embodiment, spike events are routed in the form of event packets. Each event packet includes a spike event encoded as a binary address representing an incoming axon 15 of a target neuron 11. Each event packet further includes a time stamp that is encapsulated in the event packet. In one embodiment, a time stamp indicates when a spike event is to be delivered. In another embodiment, a time stamp indicates when a spike event was generated.

As described in detail later herein, the controller 132 coordinates and synchronizes the memory block 110, the routing network 160, the computational logic unit 140, the scheduler 133, the decoder 131, the first permutation logic unit 130, and the second permutation logic unit 120.

The scheduler 133 maintains synaptic input information for the neurons 11. The scheduler 133 receives event packets from the routing network 160, and decodes incoming spike events from the event packets received. Each incoming spike event targets an incoming axon 15 of a neuron 11 represented by the memory block 110. The scheduler 133 buffers and queues each incoming spike event for delivery. In one embodiment, the scheduler 133 comprises at least one scheduler map for a core circuit 10 represented by the network circuit 100. A scheduler map for a core circuit 10 is a dual port memory including rows and columns, wherein the rows represent future time steps and the columns represent incoming axons 15 of neurons 11 of the core circuit 10. Each incoming spike event is buffered at a row and a column corresponding to a future time step and an incoming axon 15, respectively, wherein the incoming spike event is delivered to the incoming axon 15 during the future time step.

The computational logic unit 140 updates the neuronal states of the neurons 11 with corresponding neuronal data maintained within the memory block 110. For each neuron 11, the computational logic unit 140 updates a neuronal state of the neuron 11 by processing each incoming spike event targeting an incoming axon 15 of the neuron 11 based on corresponding synaptic connectivity information and neuron parameters for the neuron 11. In one embodiment, the computational logic unit 140 comprises a first set 135 of input registers, a second set 137 of input registers, an axon types register 134, a set 136 of output registers, and an outgoing event packet unit 146.

During each time step, the controller 132 loads/copies synaptic input information from the scheduler 133 to the second set 137 of input registers via the second permutation logic component 120. The second permutation logic component 120 rearranges/reorders the information copied from the scheduler 133 such that each input register of the second set 137 receives a corresponding subset of the information copied. The synaptic input information copied identifies active incoming axons 15 receiving incoming spike events in the current time step. The computational logic unit 140 iterates through the neurons 11 during the current time step to update a corresponding neuronal state of each neuron 11. Specifically, for each neuron i, the controller 132 loads/copies synaptic connectivity information, neuron parameters and a neuronal state of the neuron i from the memory block 110 into the first set 135 of input registers via the first permutation logic component 130. The first permutation logic component 120 rearranges/reorders the information copied from the memory block 110 so that each input register of the first set 135 receives a corresponding subset of the information copied. The controller 132 then instructs the computational logic unit 140 to update a corresponding neuronal state of the neuron i by processing any synaptic event (i.e., incoming spike event) targeting the neuron i.

A synaptic integration event for the neuron i is triggered when an incoming axon 15 of the neuron i receives an incoming spike event and a synaptic connection between the incoming axon 15 and the neuron i is enabled. For each active incoming axon 15 of the neuron i, the computational logic unit 140 integrates an incoming spike event targeting the active incoming axon 15 into a membrane potential variable $Vm_i$ of the neuron i based on the synaptic connectivity information of the neuron i. After integrating each incoming spike event, the controller 132 instructs the computational logic unit 140 to apply a corresponding leak rate parameter $Lk_i$ for the neuron i to the updated membrane potential variable $Vm_i$ of the neuron i. After the leak rate parameter $Lk_i$ is applied, the computational logic unit 140 determines whether the updated membrane potential variable $Vm_i$ of the neuron i exceeds a threshold parameter $Th_i$ for the neuron i. If the updated membrane potential variable $Vm_i$ exceeds the threshold parameter $Th_i$, the computational logic unit 140 generates an outgoing spike event indicating the spiking of the neuron i in the current time step. In one embodiment, the membrane potential variable $Vm_i$ may be reset (e.g., to zero) when the neuron i spikes. The updated/reset membrane potential variable $Vm_i$ is then maintained in an output register of the set 136 of output registers. The controller 132 copies/writes the updated/reset membrane potential variable $Vm_i$ from the set 136 of output registers to the memory block 110.

Output from the computational logic unit 140 may comprise payload. For example, the outgoing event packet unit 146 of the computational logic unit 140 encapsulates/encodes each outgoing spike event generated during the current time step into a corresponding outgoing address-event packet. Each outgoing address-event packet is routed to a target incoming axon 15 via the routing network 160.

Table 1 below provides example pseudo code, demonstrating the execution of the controller 132.

number of synapses 31 per neuron 11, the number of incoming axons 15 per neuron 11, and the width of a neuron parameter field (i.e., number of memory bits allocated to a neuron parameter). The scheduler 133 may also be configurable.

For example, in one embodiment, the depth of the scheduler 133 may vary. In this specification, let the depth of the scheduler 133 denote the number of rows of memory the scheduler 133 can maintain. The number of rows of memory the scheduler 133 can maintain represents the number of future time steps the scheduler 133 can buffer incoming spike events for. The memory of the scheduler 133 may be subdivided in multiple ways. For example, the memory of the scheduler 133 may be divided into two halves about a vertical line, wherein each half represents a scheduler map. The two halves may be logically stacked one on top of the other (e.g., by programming the order/sequence in which the controller 132 scans the memory of the scheduler 133). Dividing the memory of the scheduler 133 into two halves doubles the depth of the scheduler 133, but halves the width of the scheduler 133.

In one embodiment, the decoder 131 is a low-level address decoder. For example, the decoder 131 decodes a memory address sent from the controller 132 into a given row, and selects/activates the given row in the memory block 110 for a read/write operation. Therefore, by activating a given sequence of memory addresses, data can be read/written from/into memory at any location of the memory block 110.

TABLE 1

```
wait t1_clk.rising_edge //Wait for beginning of time step
//Load data from the scheduler into the second set of input registers
copy sch_location( t%16, num_axon_bank(1)) to
        input_axon_register(num_axon_bank(1));
//Cycle through all neurons to update a corresponding neuronal state of each neuron
for num_neuron=0:255
 nrn_reset_registers;
 for parm_id=0:num_parameters //Load data for a neuron into the first set of input registers
  copy mem_location(num_neuron,parm_id) to
        input_register(parm_kind(parm_id))
  for num_axon=0:num_axons //Integrate all incoming firing events targeting axons of a neuron
    if num_axon.active==1 ; nrn_synaptic_update num_axon;
  nrn_leak ; nrn_threshold ; //Apply leak rate parameter for a neuron; determine if a neuronal
                            //state of a neuron exceeds a threshold parameter for the neuron
  if spiked? //If a neuron spikes
     nrn_spike; //Generate an outgoing spike event and inject into the routing network
  copy output register to mem_location(num_neuron,Vm) //Write updated neuronal state for a
                                    //neuron back to the memory block
```

The controller 132 may copy data from any portion of the memory block 110 into any input register of the first set 135 of input registers via the first permutation logic unit 130. In one embodiment, the first permutation logic unit 130 comprises a steering network. In another embodiment, the first permutation logic unit 130 comprises a common bus.

The controller 132 may also copy data from any portion of the scheduler 133 into any input register of the second set 137 of input registers via the second permutation logic unit 120.

The sequence/order by which the controller 132 loads data from the memory block 110 to the first set 135 of input registers may vary. Further, the locations within the memory block 110 that the controller 132 loads data from may also vary.

Figure 3:
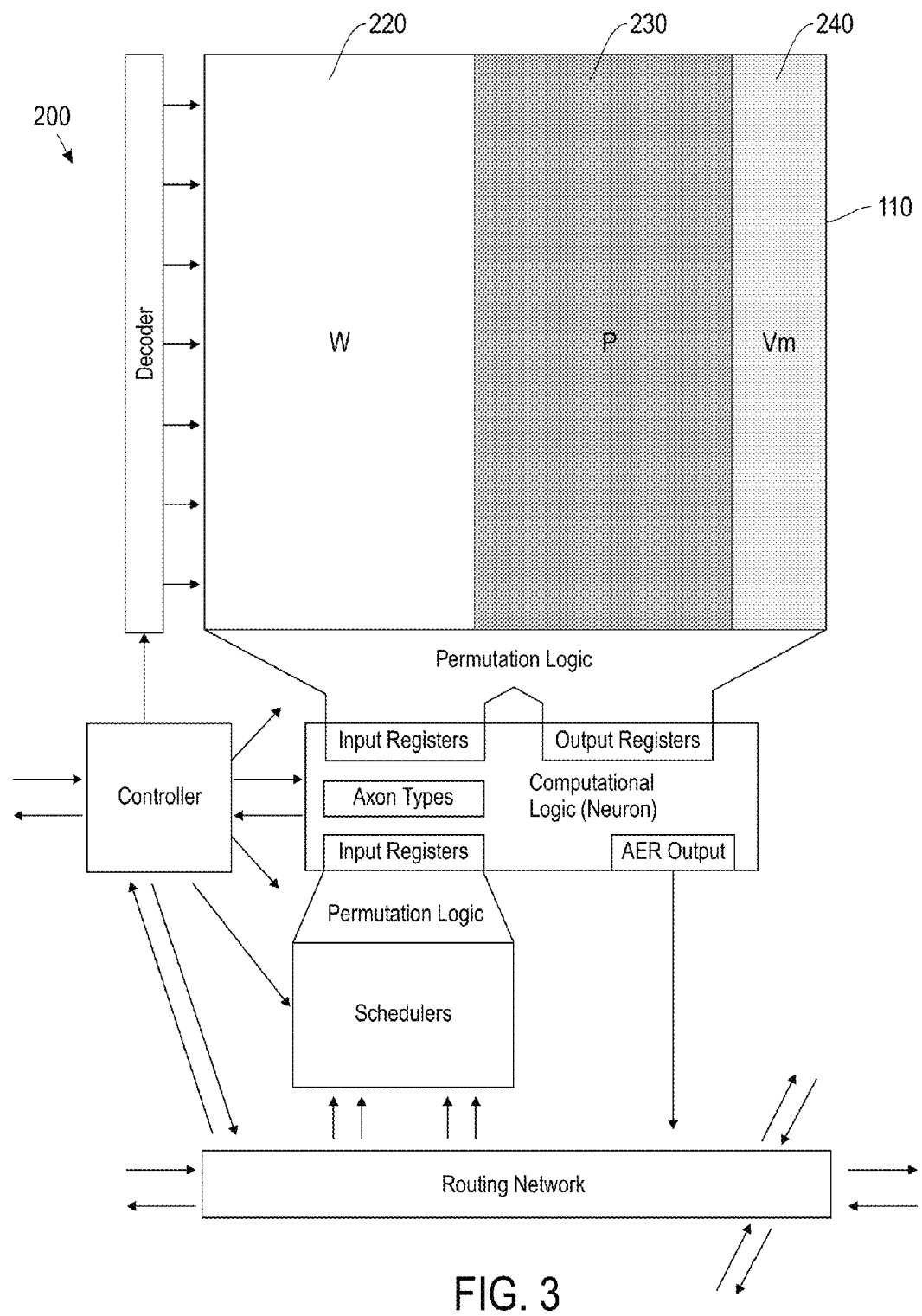
FIG. 3 illustrates an example configuration for a neurosynaptic network circuit, wherein, in the configuration, the network circuit represents a single core circuit, in accordance with an embodiment of the invention.

The network circuit 100 is configurable. For example, memory mapping and/or allocation of the memory block 110 is configurable to facilitate the following example configurations: the number of neurons 11 per core circuit 10, the FIG. 3 illustrates an example configuration 200 for a neurosynaptic network circuit 100, wherein, in the configuration 200, the network circuit 100 represents a single core circuit 10, in accordance with an embodiment of the invention. Specifically, in the configuration 200, the memory block 110 maintains neuronal data for neurons 11 of one core circuit 10.

In the configuration 200, the memory block 110 is divided into multiple memory sub-blocks, wherein each memory sub-block maintains a type of neuronal data for the neurons 11 of the core circuit 10. For example, as shown in FIG. 3, the memory block 110 is divided into the following memory sub-blocks: a first memory sub-block 220 (W) maintaining synaptic connectivity information for the neurons 11, a second memory sub-block 230 (P) maintaining neuron parameters for the neurons 11, and a third memory sub-block 240 (Vm) maintaining neuronal states for the neurons 11.

In one embodiment, for each neuron 11 of the core circuit 10, the first memory sub-block 220 maintains corresponding synaptic connectivity information for the neuron 11. Corresponding synaptic connectivity information for a neuron 11 includes corresponding synaptic weights representing synaptic connections between the neuron 11 and incoming axons 15 of the neuron 11.

In one embodiment, for each neuron 11 of the core circuit 10, the second memory sub-block 230 maintains one or more corresponding neuron parameters for the neuron 11. For example, for each neuron i, the second memory sub-block 230 maintains a corresponding threshold parameter $Th_i$, and a corresponding leak rate parameter $Lk_i$ for the neuron i.

In one embodiment, for each neuron 11 of the core circuit 10, the third memory sub-block 240 maintains a corresponding neuronal state for the neuron 11. For example, for each neuron i, the third memory sub-block 240 maintains a corresponding membrane potential variable $Vm_i$ for the neuron i.

Figure 4:
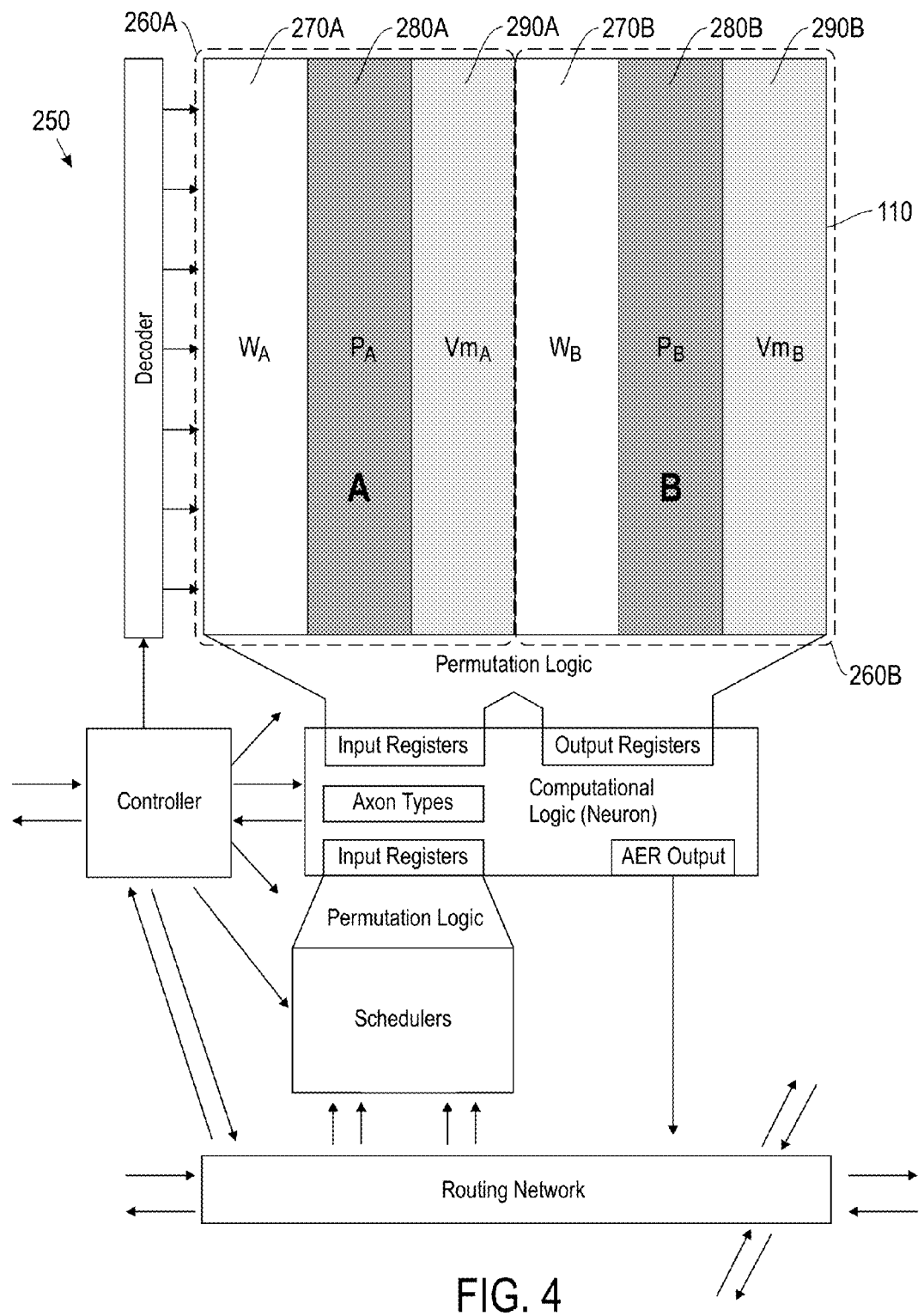
FIG. 4 illustrates an example configuration for a neurosynaptic network circuit, wherein, in the configuration, the network circuit represents two core circuits, in accordance with an embodiment of the invention.

FIG. 4 illustrates an example configuration 250 for a neurosynaptic network circuit 100, wherein, in the configuration 250, the network circuit 100 represents two core circuits 10, in accordance with an embodiment of the invention. Specifically, in the configuration 250, the memory block 110 maintains neuronal data for neurons 11 of a first core circuit A and neurons 11 of a second core circuit B.

In the configuration 250, the memory block 110 is divided into a first set 260A of memory sub-blocks and a second set 260B of memory sub-blocks. Each memory sub-block of the first set 260A of memory sub-blocks maintains a type of neuronal data for neurons 11 of the first core circuit A. Each memory sub-block of the second set 260B of memory sub-blocks maintains a type of neuronal data for neurons 11 of the second core circuit B. For example, as shown in FIG. 4, the first set 260A of memory sub-blocks 110 includes a first memory sub-block 270A ($W_A$), a second memory sub-block 280A ($P_A$), and a third memory sub-block 290A ($Vm_A$) maintaining synaptic connectivity information, neuron parameters, and neuronal states, respectively, for the neurons 11 of the first core circuit A. Also shown in FIG. 4, the second set 260B of memory sub-blocks 110 includes a first memory sub-block 270B ($W_B$), a second memory sub-block 280B ($P_B$), and a third memory sub-block 290B ($Vm_B$) maintaining synaptic connectivity information, neuron parameters, and neuronal states, respectively, for the neurons 11 of the second core circuit B.

The memory block 110 in the configuration 250 in FIG. 4 maintains twice the number of neurons 11 than the memory block 110 in the configuration 200 in FIG. 3. In one embodiment, the number of neurons 11 may be doubled as in FIG. 4 by reducing the number of bits allocated for maintaining corresponding synaptic connectivity information and/or corresponding neuron parameters for each neuron 11. In one embodiment, the neurons 11 of the first core circuit A and the second core circuit B share the same set of incoming axons 15. The scheduler 133 only needs one scheduler map when the first core circuit A and the second core circuit B share the same set of incoming axons 15.

Figure 5:
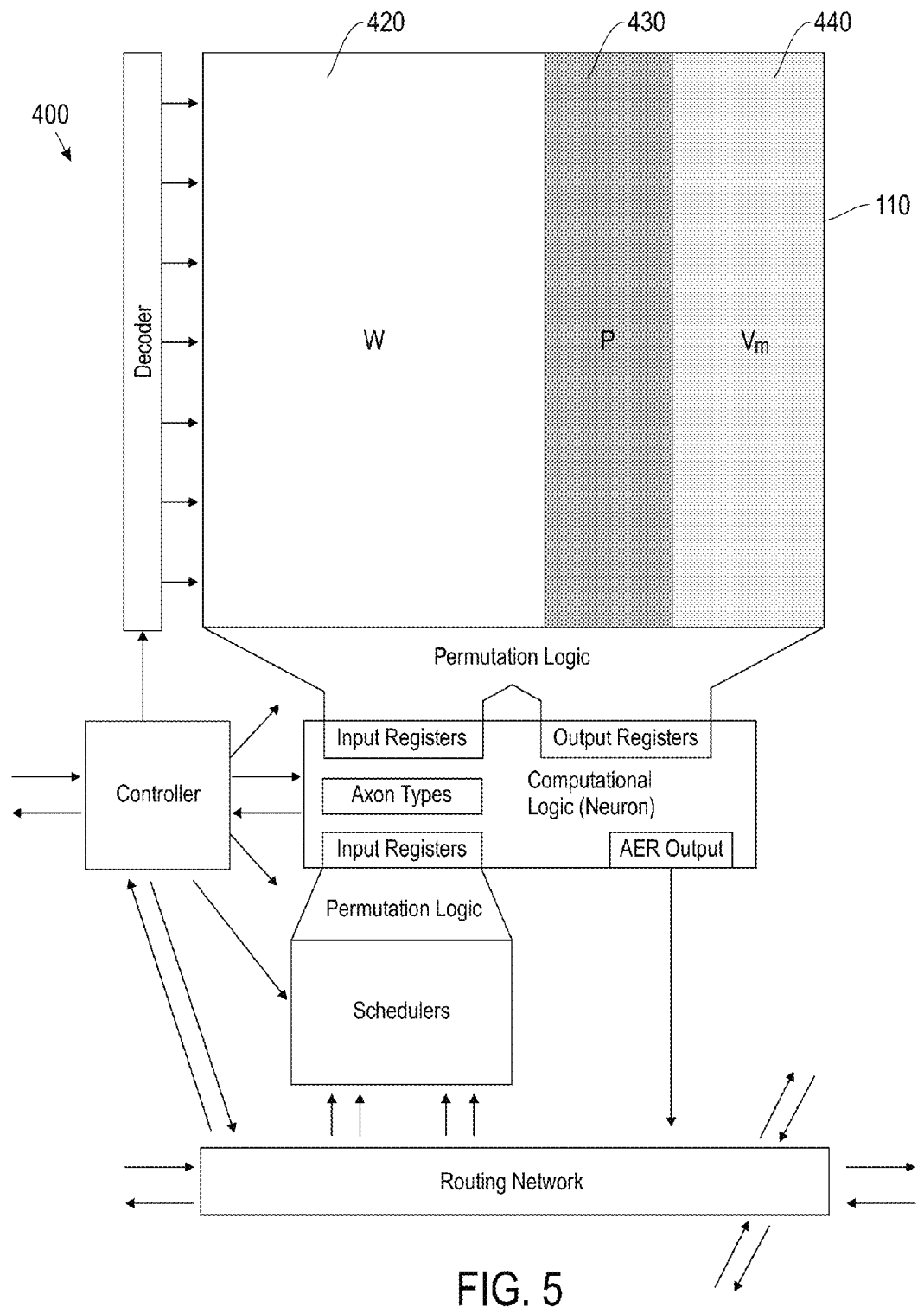
FIG. 5 illustrates an example configuration for a neurosynaptic network circuit, wherein, in the configuration, the network circuit represents a single core circuit with twice as many synaptic connections than the single core circuit represented in FIG. 3, in accordance with an embodiment of the invention.

FIG. 5 illustrates an example configuration 400 for a neurosynaptic network circuit 100, wherein, in the configuration 400, the network circuit 100 represents a single core circuit 10 with at least twice as many synaptic connections than the single core circuit 10 represented in FIG. 3, in accordance with an embodiment of the invention. In the configuration 400, the memory block 110 is divided into multiple memory sub-blocks, wherein each memory sub-block maintains a type of neuronal data for neurons 11 of a single core circuit 10. For example, as shown in FIG. 5, the memory block 110 is divided into the following memory sub-blocks: a first memory sub-block 420 (W) maintaining synaptic connectivity information for the neurons 11, a second memory sub-block 430 (P) maintaining neuron parameters for the neurons 11, and a third memory sub-block 440 (Vm) maintaining neuronal states for the neurons 11.

The number of bits allocated for the first memory sub-block 420 in FIG. 5 is at least double the number of bits allocated for the first memory sub-block 220 in FIG. 3. Therefore, the number of incoming axons 15 per neuron 11 of the core circuit 10 represented in FIG. 5 is at least double the number of incoming axons 15 per neuron 11 of the core circuit 10 represented in FIG. 3.

In one embodiment, the number of incoming axons 15 may be doubled as in FIG. 5 by reducing the number of bits allocated for maintaining corresponding neuron parameters for each neuron 11.

Figure 6:
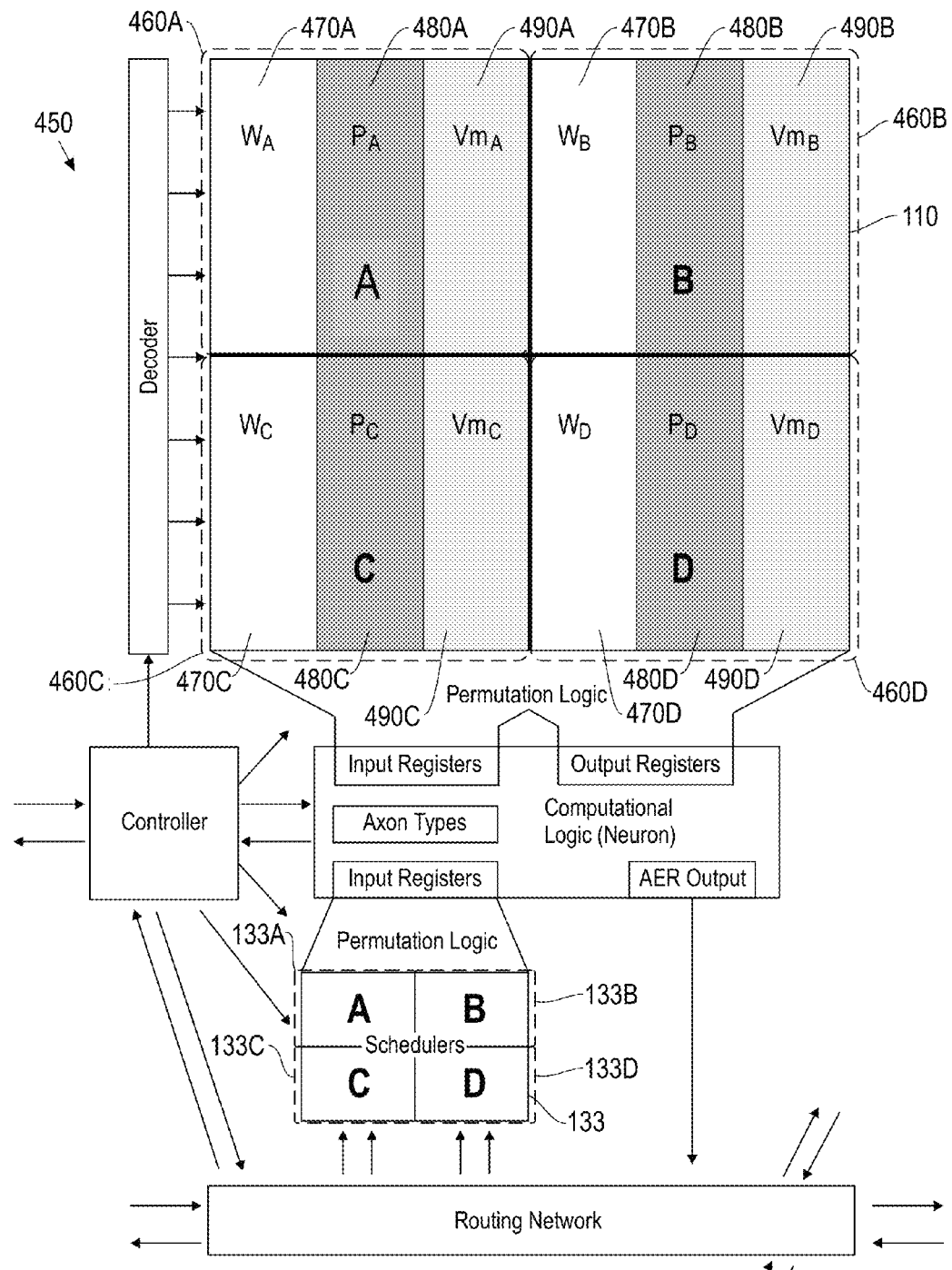
FIG. 6 illustrates an example configuration for a neurosynaptic network circuit, wherein, in the configuration, the network circuit represents four core circuits, in accordance with an embodiment of the invention.

FIG. 6 illustrates an example configuration 450 for a neurosynaptic network circuit 100, wherein, in the configuration 450, the network circuit 100 represents four core circuits 10, in accordance with an embodiment of the invention. Specifically, in the configuration 450, the memory block 110 maintains neuronal data for neurons 11 of a first core circuit A, neurons 11 of a second core circuit B, neurons 11 of a third core circuit C, and neurons 11 of a fourth core circuit D.

In the configuration 450, the memory block 110 is divided into a first set 460A of memory sub-blocks, a second set 460B of memory sub-blocks, a third set 460C of memory sub-blocks, and a fourth set 460D of memory sub-blocks. Each memory sub-block of the first set 460A of memory sub-blocks maintains a type of neuronal data for neurons 11 of the first core circuit A. Each memory sub-block of the second set 460B of memory sub-blocks maintains a type of neuronal data for neurons 11 of the second core circuit B. Each memory sub-block of the third set 460C of memory sub-blocks maintains a type of neuronal data for neurons 11 of the third core circuit C. Each memory sub-block of the fourth set 460D of memory sub-blocks maintains a type of neuronal data for neurons 11 of the fourth core circuit D.

For example, as shown in FIG. 6, the first set 460A of memory sub-blocks 110 includes a first memory sub-block 470A ($W_A$), a second memory sub-block 480A ($P_A$), and a third memory sub-block 490A ($Vm_A$) maintaining synaptic connectivity information, neuron parameters, and neuronal states, respectively, for the neurons 11 of the first core circuit A. The second set 460B of memory sub-blocks 110 includes a first memory sub-block 470B ($W_B$), a second memory sub-block 480B ($P_B$), and a third memory sub-block 490B ($Vm_B$) maintaining synaptic connectivity information, neuron parameters, and neuronal states, respectively, for the neurons 11 of the second core circuit B. The third set 460C of memory sub-blocks 110 includes a first memory sub-block 470C ($W_C$), a second memory sub-block 480C ($P_C$), and a third memory sub-block 490C ($Vm_C$) maintaining synaptic connectivity information, neuron parameters, and neuronal states, respectively, for the neurons 11 of the third core circuit C. The fourth set 460D of memory sub-blocks 110 includes a first memory sub-block 470D ($W_D$), a second memory sub-block 480D ($P_D$), and a third memory sub-block 490D ($Vm_D$) maintaining synaptic connectivity information, neuron parameters, and neuronal states, respectively, for the neurons 11 of the fourth core circuit D.

The memory block 110 in the configuration 450 in FIG. 6 maintains at least four times the number of neurons 11 than the memory block 110 in the configuration 200 in FIG. 3. In one embodiment, the number of neurons 11 may be doubled as in FIG. 6 by reducing the number of bits allocated for maintaining corresponding synaptic connectivity information and/or corresponding neuron parameters for each neuron 11. In another embodiment, the size of the memory block 110 in FIG. 6 may be larger than the size of the memory block 110 in FIG. 3.

Further, in the configuration 450, the scheduler 133 comprises four scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, a third scheduler map 133C for incoming spike events targeting incoming axons 15 of neurons 11 of the third core circuit C, and a fourth scheduler map 133D for incoming spike events targeting incoming axons 15 of neurons 11 of the fourth core circuit D.

Figure 7:
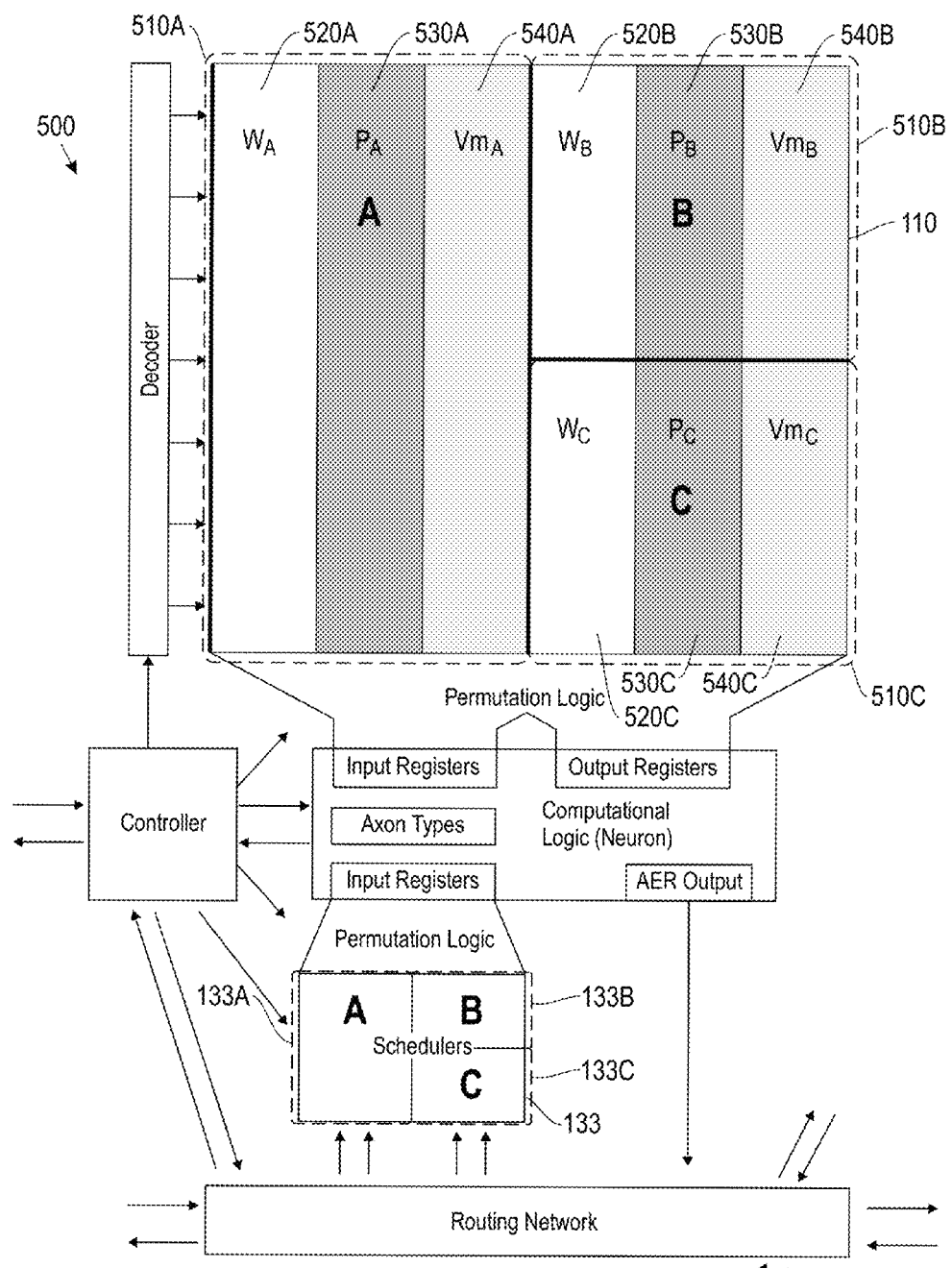
FIG. 7 illustrates an example configuration for a neurosynaptic network circuit, wherein, in the configuration, the network circuit represents three core circuits with varying number of synapses and axons, in accordance with an embodiment of the invention.

FIG. 7 illustrates an example configuration 500 for a neurosynaptic network circuit 100, wherein, in the configuration 500, the network circuit 100 represents three core circuits 10 with varying number of synapses 31 and axons 15, in accordance with an embodiment of the invention. Specifically, in the configuration 500, the memory block 110 maintains neuronal data for neurons 11 of a first core circuit A, neurons 11 of a second core circuit B, and neurons 11 of a third core circuit C. The first core circuit A has at least double the number of incoming axons 15 and synapses 31 per neuron 11 compared to the second core circuit B and the third core circuit C.

In the configuration 500, the memory block 110 is divided into a first set 510A of memory sub-blocks, a second set 510B of memory sub-blocks, and a third set 510C of memory sub-blocks. As shown in FIG. 7, the first set 510A of memory sub-blocks is at least double the size of either the second set 510B of memory sub-blocks or the third set 510C of memory sub-blocks. Each memory sub-block of the first set 510A of memory sub-blocks maintains a type of neuronal data for neurons 11 of the first core circuit A. Each memory sub-block of the second set 510B of memory sub-blocks maintains a type of neuronal data for neurons 11 of the second core circuit B. Each memory sub-block of the third set 510C of memory sub-blocks maintains a type of neuronal data for neurons 11 of the third core circuit C.

For example, as shown in FIG. 7, the first set 510A of memory sub-blocks 110 includes a first memory sub-block 520A ($W_A$), a second memory sub-block 530A ($P_A$), and a third memory sub-block 540A ($Vm_A$) maintaining synaptic connectivity information, neuron parameters, and neuronal states, respectively, for the neurons 11 of the first core circuit A. The second set 510B of memory sub-blocks 110 includes a first memory sub-block 520B ($W_B$), a second memory sub-block 530B ($P_B$), and a third memory sub-block 540B ($Vm_B$) maintaining synaptic connectivity information, neuron parameters, and neuronal states, respectively, for the neurons 11 of the second core circuit B. The third set 510C of memory sub-blocks 110 includes a first memory sub-block 520C ($W_C$), a second memory sub-block 530C ($P_C$), and a third memory sub-block 540C ($Vm_C$) maintaining synaptic connectivity information, neuron parameters, and neuronal states, respectively, for the neurons 11 of the third core circuit C.

Further, in the configuration 500, the scheduler 133 comprises three scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, and a third scheduler map 133C for incoming spike events targeting incoming axons 15 of neurons 11 of the third core circuit C.

Figure 8:
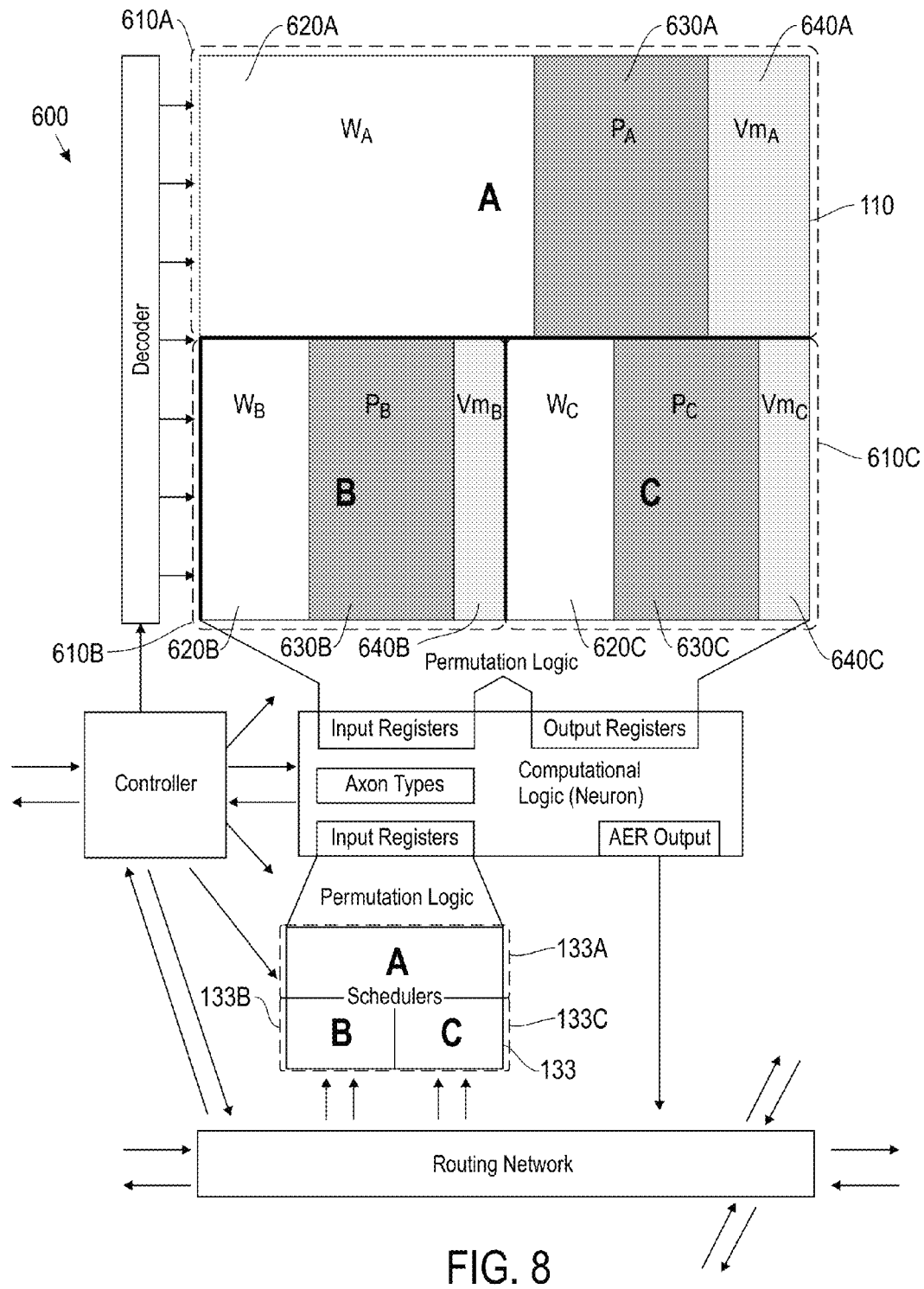
FIG. 8 illustrates an example configuration for a neurosynaptic network circuit, wherein, in the configuration, the network circuit represents three core circuits with varying number of synapses and axons, in accordance with an embodiment of the invention.

FIG. 8 illustrates an example configuration 600 for a neurosynaptic network circuit 100, wherein, in the configuration 600, the network circuit 100 represents three core circuits 10 with varying number of synapses and axons, in accordance with an embodiment of the invention. Specifically, in the configuration 600, the memory block 110 maintains neuronal data for neurons 11 of a first core circuit A, neurons 11 of a second core circuit B, and neurons 11 of a third core circuit C. The first core circuit A has at least double the number of incoming axons 15 and synapses 31 per neuron 11 compared to the second core circuit B and the third core circuit C.

In the configuration 600, the memory block 110 is divided into a first set 610A of memory sub-blocks, a second set 610B of memory sub-blocks, and a third set 610C of memory sub-blocks. As shown in FIG. 8, the first set 610A of memory sub-blocks is at least double the size of either the second set 610B of memory sub-blocks or the third set 610C of memory sub-blocks. Each memory sub-block of the first set 610A of memory sub-blocks maintains a type of neuronal data for neurons 11 of the first core circuit A. Each memory sub-block of the second set 610B of memory sub-blocks maintains a type of neuronal data for neurons 11 of the second core circuit B. Each memory sub-block of the third set 610C of memory sub-blocks maintains a type of neuronal data for neurons 11 of the third core circuit C.

For example, as shown in FIG. 8, the first set 610A of memory sub-blocks 110 includes a first memory sub-block 620A ($W_A$), a second memory sub-block 630A ($P_A$), and a third memory sub-block 640A ($Vm_A$) maintaining synaptic connectivity information, neuron parameters, and neuronal states, respectively, for the neurons 11 of the first core circuit A. The second set 610B of memory sub-blocks 110 includes a first memory sub-block 620B ($W_B$), a second memory sub-block 630B ($P_B$), and a third memory sub-block 640B ($Vm_B$) maintaining synaptic connectivity information, neuron parameters, and neuronal states, respectively, for the neurons 11 of the second core circuit B. The third set 610C of memory sub-blocks 110 includes a first memory sub-block 620C ($W_C$), a second memory sub-block 630C ($P_C$), and a third memory sub-block 640C ($Vm_C$) maintaining synaptic connectivity information, neuron parameters, and neuronal states, respectively, for the neurons 11 of the third core circuit C.

Further, in the configuration 600, the scheduler 133 comprises three scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, and a third scheduler map 133C for incoming spike events targeting incoming axons 15 of neurons 11 of the third core circuit C.

While the first core circuit A represented by the first set 610A of memory sub-blocks in FIG. 8 and the first core circuit A represented by the first set 510A of memory sub-blocks in FIG. 7 have about the same number of incoming axons 15 and synapses 31 per neuron 11, the first core circuit A in FIG. 8 is logically mapped to a different area of the memory block 110 than the first core circuit A in FIG. 7. The first scheduler map 133A for the first core circuit A in FIG. 8 is also logically mapped to a different area of the scheduler 133 than the first scheduler map 133A for the first core circuit A in FIG. 7.

Figure 9:
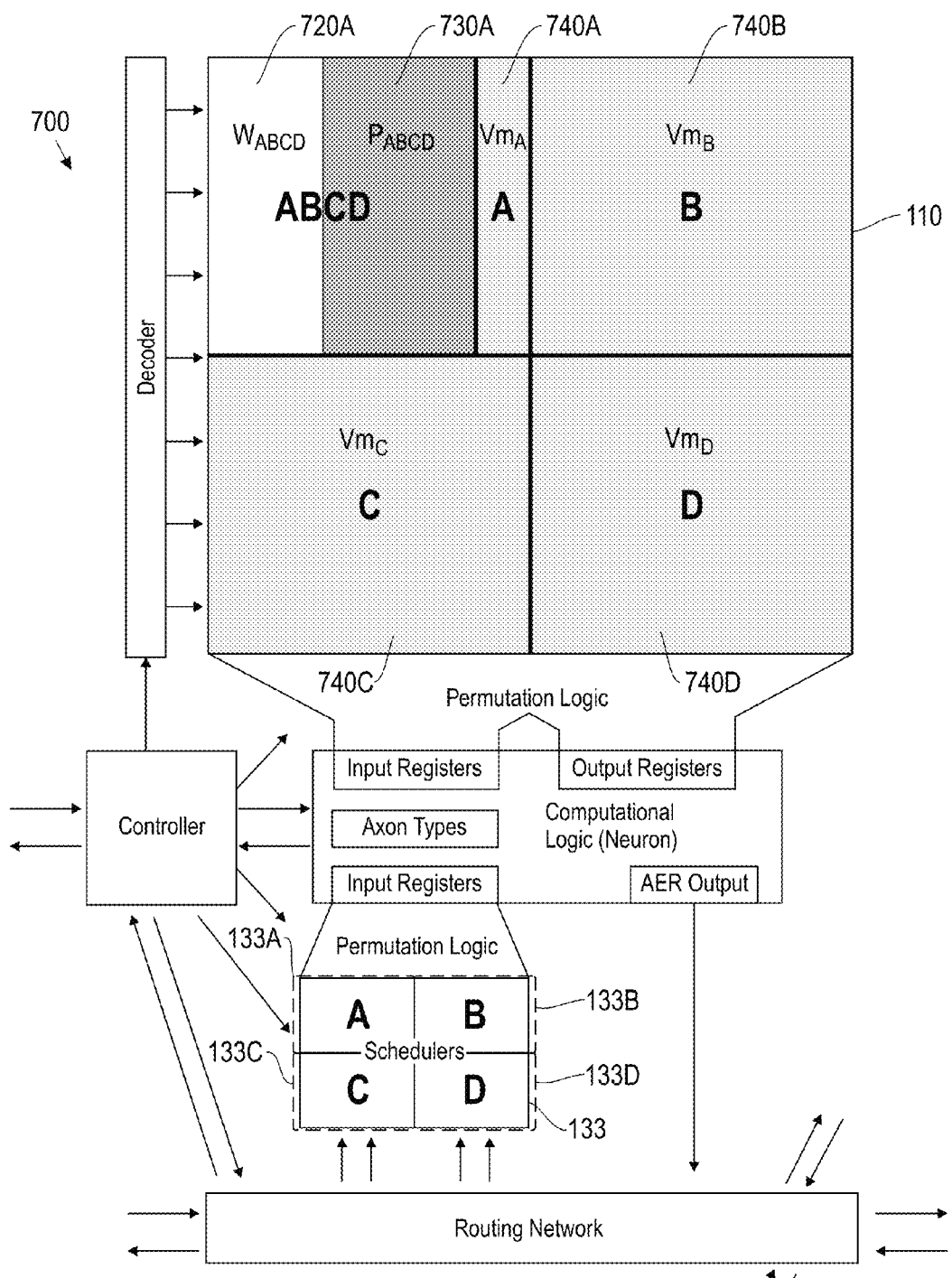
FIG. 9 illustrates an example configuration for a neurosynaptic network circuit, wherein, in the configuration, the network circuit represents four core circuits with shared synaptic weights and neuron parameters, in accordance with an embodiment of the invention.

FIG. 9 illustrates an example configuration 700 for a neurosynaptic network circuit 100, wherein, in the configuration 700, the network circuit 100 represents four core circuits 10 with shared synaptic weights and neuron parameters, in accordance with an embodiment of the invention. In the configuration 700, neurons 11 of a first core circuit A, a second core circuit B, a third core circuit C and a fourth core circuit D share a common set of synaptic weights and a common set of neuron parameters.

As shown in FIG. 9, the memory block 110 is divided into the following memory sub-blocks: a first memory sub-block 720A maintaining a common set of synaptic weights for the core circuits A, B, C and D, a second memory sub-block 730A maintaining a common set of neuron parameters for the core circuits A, B, C and D, a third memory sub-block 740A maintaining neuronal states for only neurons 11 of the first core circuit A, a fourth memory sub-block 740B maintaining neuronal states for only neurons 11 of the second core circuit B, a fifth memory sub-block 740C maintaining neuronal states for only neurons 11 of the third core circuit C, and a sixth memory sub-block 740D maintaining neuronal states for only neurons 11 of the fourth core circuit D.

In the configuration 700, shared synaptic weights and shared neuron parameters are only loaded into the computational logic unit 140 once for similar neurons 11 of the core circuits A, B, C and D.

In the configuration 700, the scheduler 133 comprises four scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, a third scheduler map 133C for incoming spike events targeting incoming axons 15 of neurons 11 of the third core circuit C, and a fourth scheduler map 133D for incoming spike events targeting incoming axons 15 of neurons 11 of the fourth core circuit D.

Figure 10:
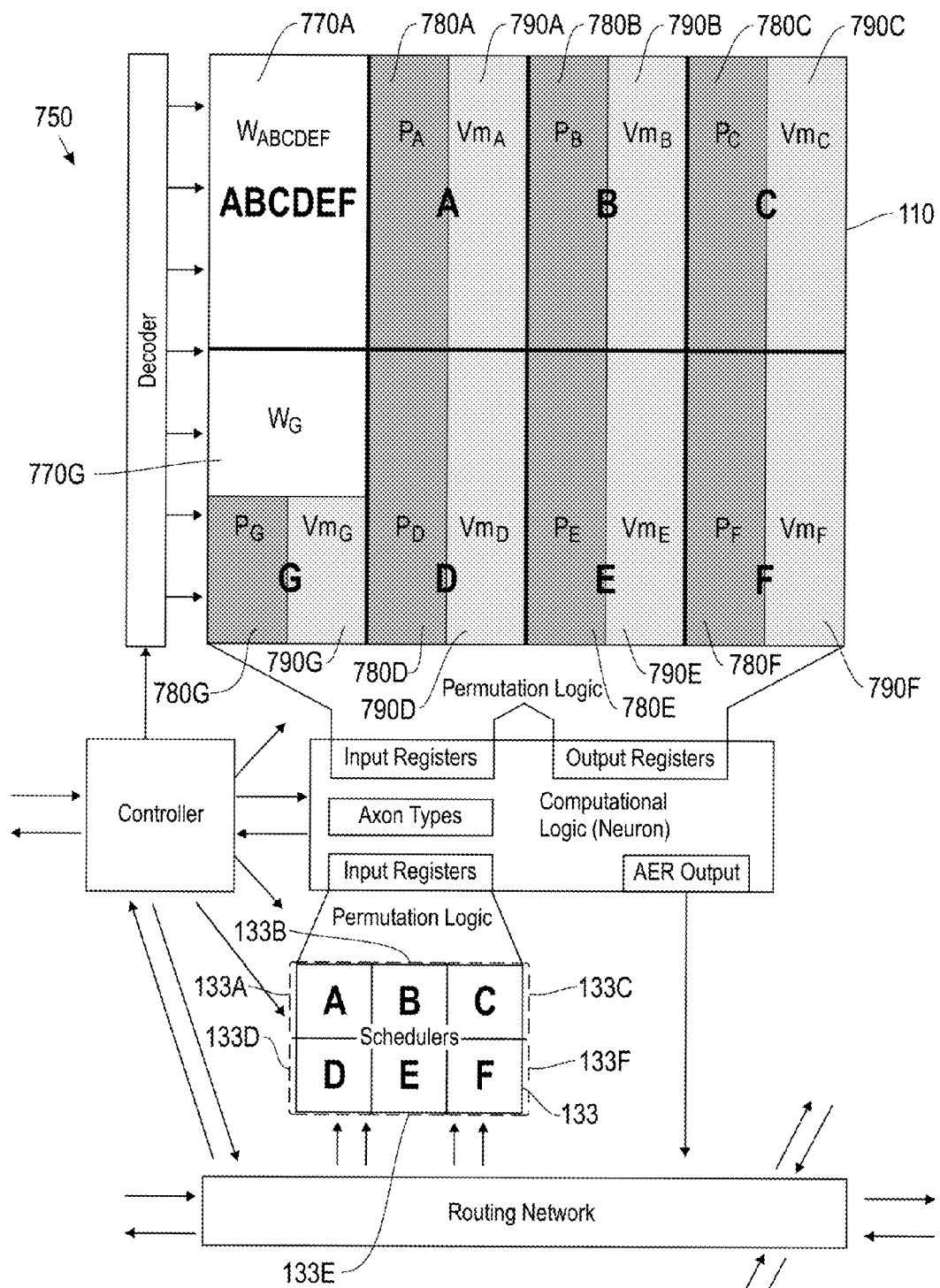
FIG. 10 illustrates an example configuration for a neurosynaptic network circuit, wherein, in the configuration, the network circuit represents seven core circuits including some core circuits with shared synaptic weights, in accordance with an embodiment of the invention.

FIG. 10 illustrates an example configuration 750 for a neurosynaptic network circuit 100, wherein, in the configuration 750, the network circuit 100 represents seven core circuits 10 including some core circuits 10 with shared synaptic weights, in accordance with an embodiment of the invention. In the configuration 750, neurons 11 of a first core circuit A, a second core circuit B, a third core circuit C, a fourth core circuit D, a fifth core circuit E and a sixth core circuit F share a common set of synaptic weights, whereas neurons 11 of a seventh core circuit G has its own set of synaptic weights.

As shown in FIG. 10, the memory block 110 includes a memory sub-block 770A maintaining a common set of synaptic weights for the core circuits A, B, C, D, E and F, and a memory sub-block 770G maintaining synaptic weights for the seventh core circuit G. The memory block 110 further includes memory sub-blocks 780A, 780B, 780C, 780D, 780E, 780F and 780G maintaining neuron parameters for the neurons 11 of the first core circuit A, the second core circuit B, the third core circuit C, the fourth core circuit D, the fifth core circuit E, the sixth core circuit F and the seventh core circuit G, respectively. The memory block 110 further includes memory sub-blocks 790A, 790B, 790C, 790D, 790E, 790F and 790G maintaining neuronal states for the neurons 11 of the first core circuit A, the second core circuit B, the third core circuit C, the fourth core circuit D, the fifth core circuit E, the sixth core circuit F and the seventh core circuit G, respectively.

In the configuration 750, shared synaptic weights are only loaded into the computational logic unit 140 once for similar neurons 11 of the core circuits A, B, C, D, E and F.

In one embodiment, the neurons 11 of the seventh core circuit G represent control neurons that have no incoming axons 15 and that spike simultaneously. Therefore, in the configuration 750, the scheduler 133 comprises only six scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, a third scheduler map 133C for incoming spike events targeting incoming axons 15 of neurons 11 of the third core circuit C, a fourth scheduler map 133D for incoming spike events targeting incoming axons 15 of neurons 11 of the fourth core circuit D, a fifth scheduler map 133E for incoming spike events targeting incoming axons 15 of neurons 11 of the fifth core circuit E, and a sixth scheduler map 133F for incoming spike events targeting incoming axons 15 of neurons 11 of the sixth core circuit F.

Figure 11:
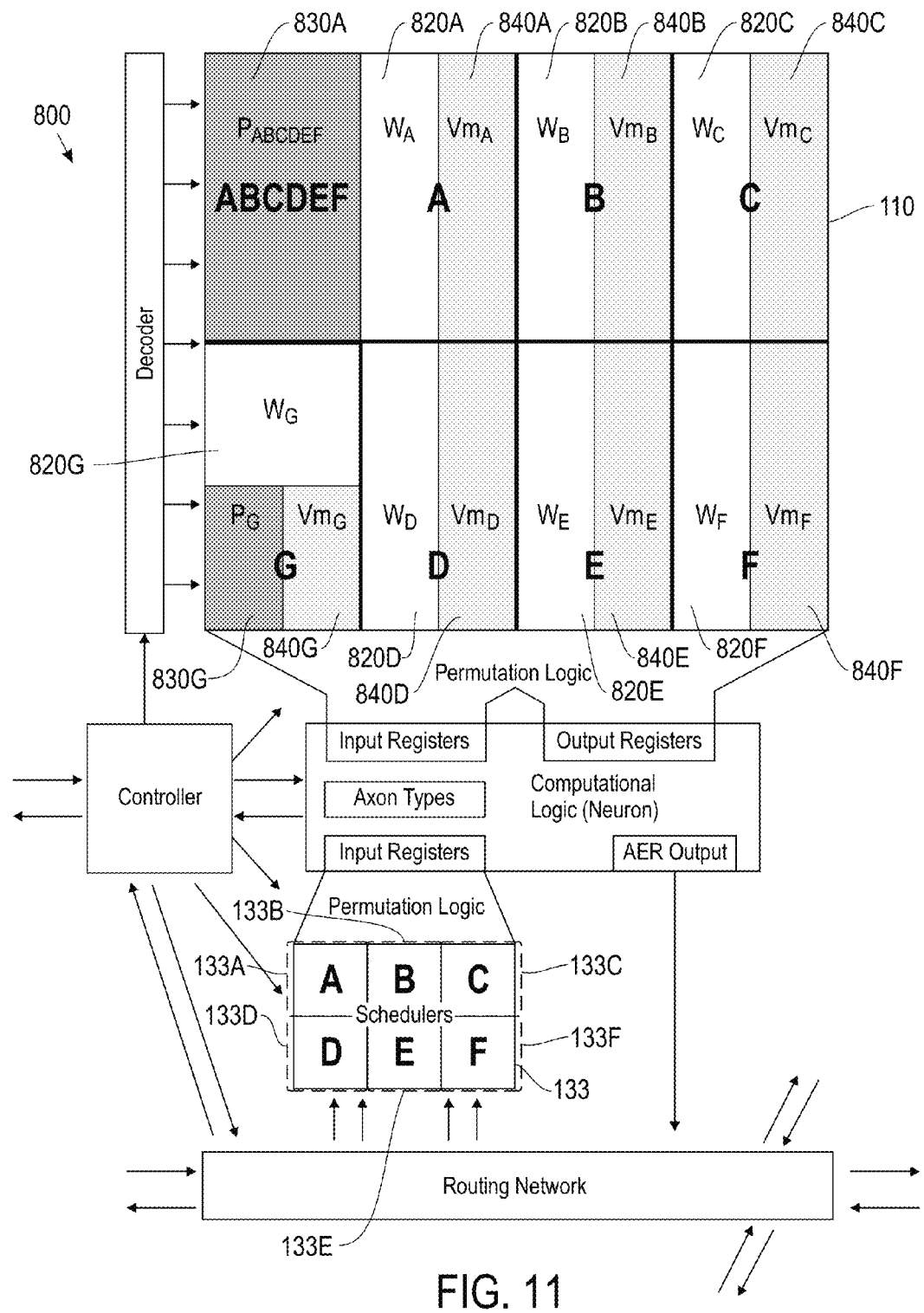
FIG. 11 illustrates an example configuration for a neurosynaptic network circuit, wherein, in the configuration, the network circuit represents seven core circuits including some core circuits with shared neuron parameters, in accordance with an embodiment of the invention.

FIG. 11 illustrates an example configuration 800 for a neurosynaptic network circuit 100, wherein, in the configuration 800, the network circuit 100 represents seven core circuits 10 including some core circuits with shared neuron parameters, in accordance with an embodiment of the invention.

In the configuration 800, neurons 11 of a first core circuit A, a second core circuit B, a third core circuit C, a fourth core circuit D, a fifth core circuit E and a sixth core circuit F share a common set of neuron parameters, whereas neurons 11 of a seventh core circuit G has its own set of neuron parameters. As shown in FIG. 11, the memory block 110 includes a memory sub-block 830A maintaining a common set of neuron parameters for the core circuits A, B, C, D, E and F, and a memory sub-block 830G maintaining neuron parameters for the seventh core circuit G. The memory block 110 further includes memory sub-blocks 820A, 820B, 820C, 820D, 820E, 820F and 820G maintaining synaptic connectivity information for the neurons 11 of the first core circuit A, the second core circuit B, the third core circuit C, the fourth core circuit D, the fifth core circuit E, the sixth core circuit F and the seventh core circuit G, respectively. The memory block 110 further includes memory sub-blocks 840A, 840B, 840C, 840D, 840E, 840F and 840G maintaining neuronal states for the neurons 11 of the first core circuit A, the second core circuit B, the third core circuit C, the fourth core circuit D, the fifth core circuit E, the sixth core circuit F and the seventh core circuit G, respectively.

In the configuration 800, shared neuron parameters are only loaded into the computational logic unit 140 once for similar neurons 11 of the core circuits A, B, C, D, E and F.

In one embodiment, the neurons 11 of the seventh core circuit G represent control neurons that have no incoming axons 15 and spike simultaneously. Therefore, in the configuration 800, the scheduler 133 comprises six only scheduler maps: a first scheduler map 133A for incoming spike events targeting incoming axons 15 of neurons 11 of the first core circuit A, a second scheduler map 133B for incoming spike events targeting incoming axons 15 of neurons 11 of the second core circuit B, a third scheduler map 133C for incoming spike events targeting incoming axons 15 of neurons 11 of the third core circuit C, a fourth scheduler map 133D for incoming spike events targeting incoming axons 15 of neurons 11 of the fourth core circuit D, a fifth scheduler map 133E for incoming spike events targeting incoming axons 15 of neurons 11 of the fifth core circuit E, and a sixth scheduler map 133F for incoming spike events targeting incoming axons 15 of neurons 11 of the sixth core circuit F.

Figure 12:
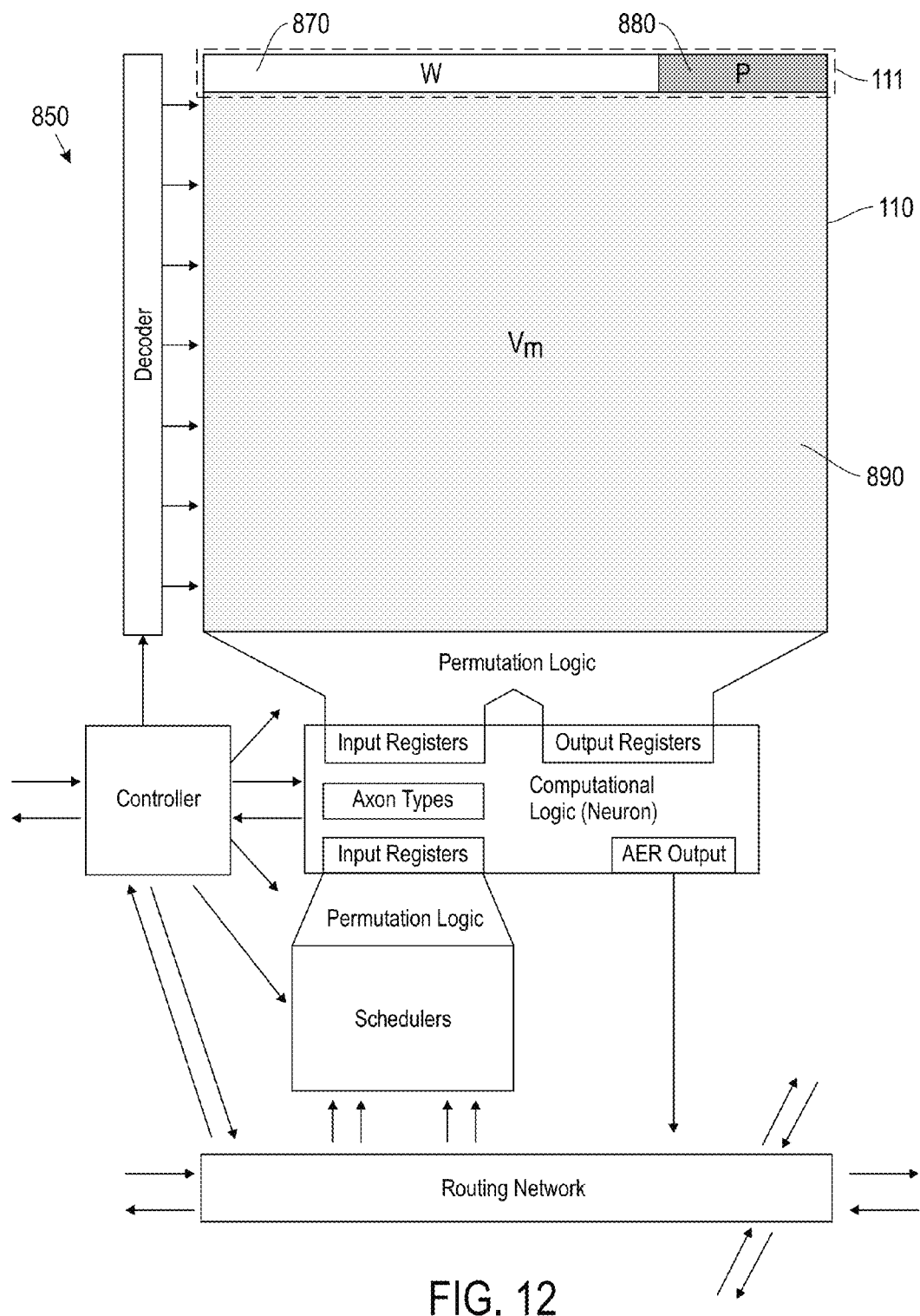
FIG. 12 illustrates an example configuration for a neurosynaptic network circuit, in accordance with an embodiment of the invention.

FIG. 12 illustrates an example configuration 850 for a neurosynaptic network circuit 100, in accordance with an embodiment of the invention. Specifically, in the configuration 850, a first row 111 of the memory block 110 is divided into a first set 870 of memory sub-blocks maintaining receptive fields for neurons 11 of a core circuit 10, and a second set 880 of memory sub-blocks maintaining neuron parameters for the neurons 11. Subsequent rows 111 of the memory block 110 represent a third set 890 of memory sub-blocks maintaining neuronal states for the neurons 11 of the core circuit 10. Advancing through the rows 111 of the memory block 110 shifts a receptive field in permute logic for each neuron 11, thereby building a convolution network. Neurons 11 in the same row 111 may have slightly different receptive fields or different neuron parameters.

Figure 13:
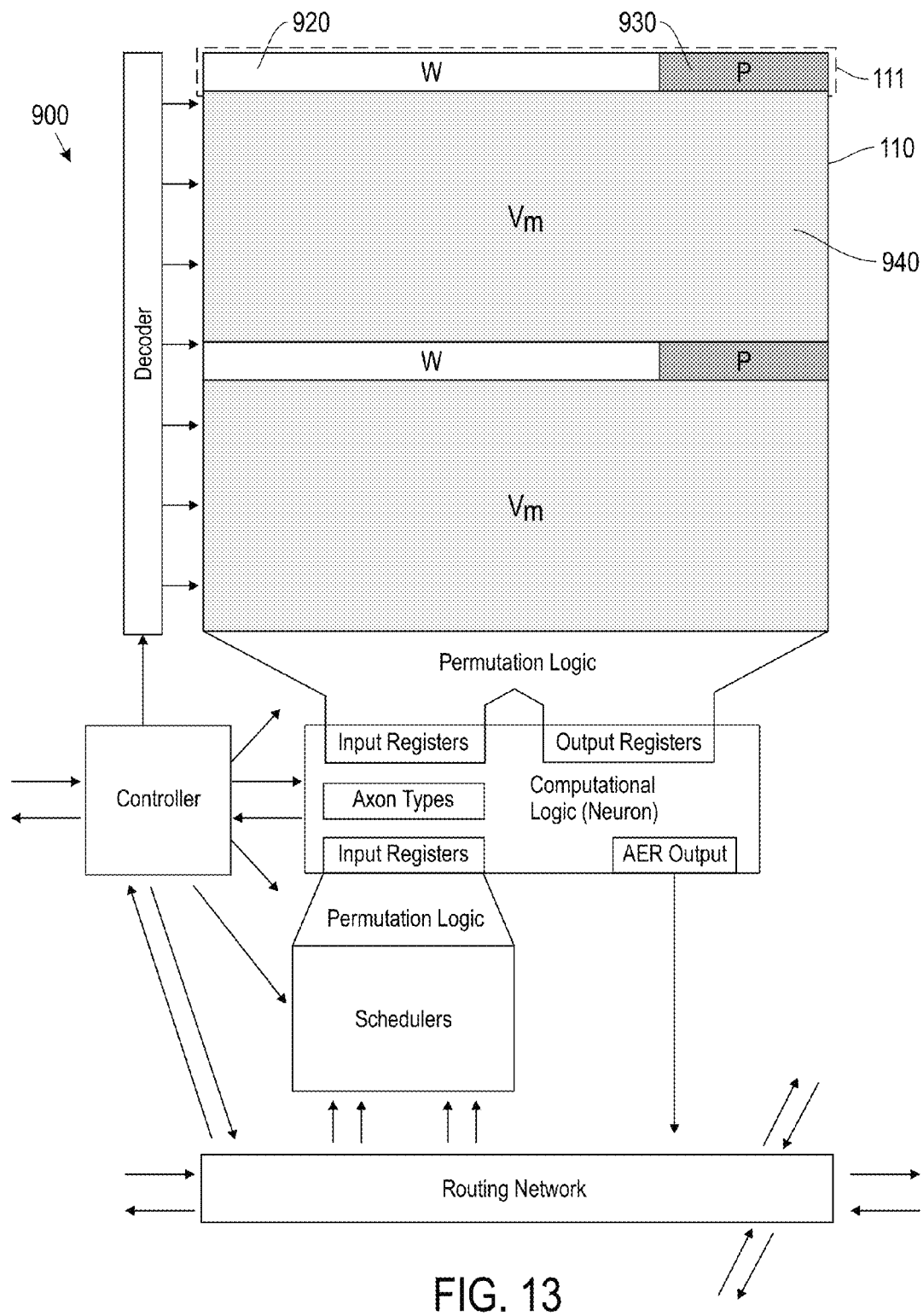
FIG. 13 illustrates an example configuration for a neurosynaptic network circuit, in accordance with an embodiment of the invention.

FIG. 13 illustrates an example configuration 900 for a neurosynaptic network circuit 100, in accordance with an embodiment of the invention. Specifically, in the configuration 900, a first row 111 and each $N^{th}$ row of the memory block 110 is divided into a first set 920 of memory sub-blocks maintaining receptive fields for neurons 11 of a core circuit 10, and a second set 930 of memory sub-blocks maintaining neuron parameters for the neurons 11. The remaining rows 111 of the memory block 110 represent a third set 940 of memory sub-blocks maintaining neuronal states for the neurons 11 of the core circuit 10.

As stated above, the first set 135 of input registers of the computational logic unit 140 is used to latch data from the memory block 110, such as synaptic weights, neuron parameters, and neuronal states. In addition to latching data, the first set 135 of input registers may also be used to shift data around. For example, a seed pattern for synaptic weights may be loaded once into an input register 135A (FIG. 14) of the first set 135, wherein the input register 135A specifically latches synaptic weights. For each neuron being processed, the input register 135A shifts all bits to the right (or left) to implement a different pattern of synaptic weights. The process of shifting the pattern of synaptic weights while keeping the data in the other input registers of the first set 135 is analogous to implementing a convolution on a set of input data.

Figure 14:
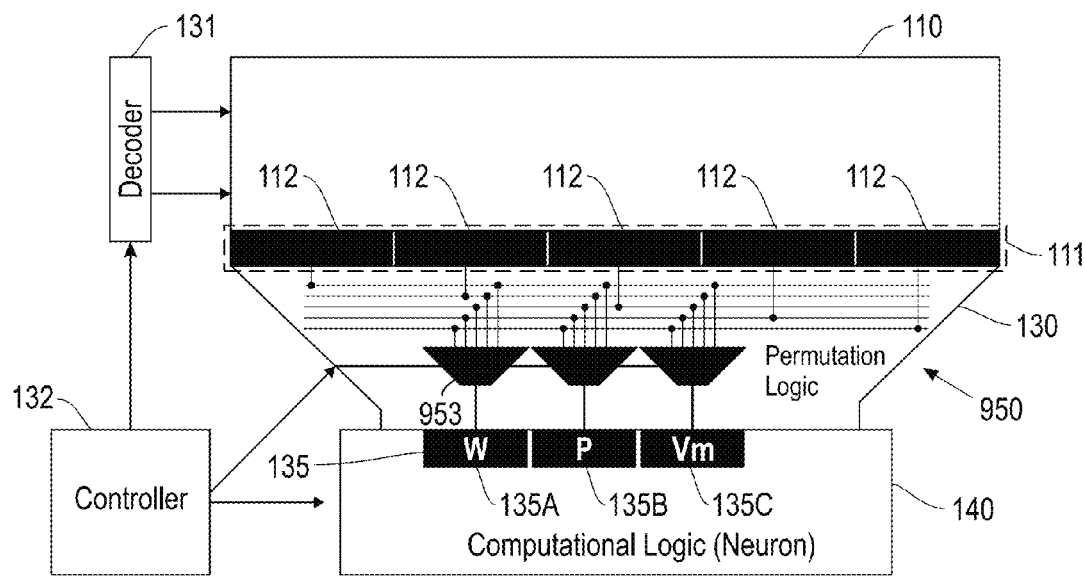
FIG. 14 illustrates an example steering network for the first permutation logic unit, in accordance with an embodiment of the invention.

FIG. 14 illustrates an example steering network 950 for the first permutation logic unit 130, in accordance with an embodiment of the invention. The steering network 950 is configured for steering data and permuting data in parallel through a set of selectors (or multiplexors) 953. Each row 111 of data from the memory block 110 is segmented into multiple data groups 112, wherein each data group 112 is n-bits wide. Each data group 112 is connected to a set of selectors 953 that are set by the controller 132, such that neuronal data (i.e., synaptic weights, neuron parameters and neuronal states) is routed to the first set 135 of input registers of the computational logic unit 140. The first set 135 of input registers may include an input register 135A for maintaining synaptic weights, an input register 135B for maintaining neuron parameters, and an input register 135C for maintaining neuronal states. The steering network operates in parallel so it is fast at the expense of significant wiring and logic.

Figure 15:
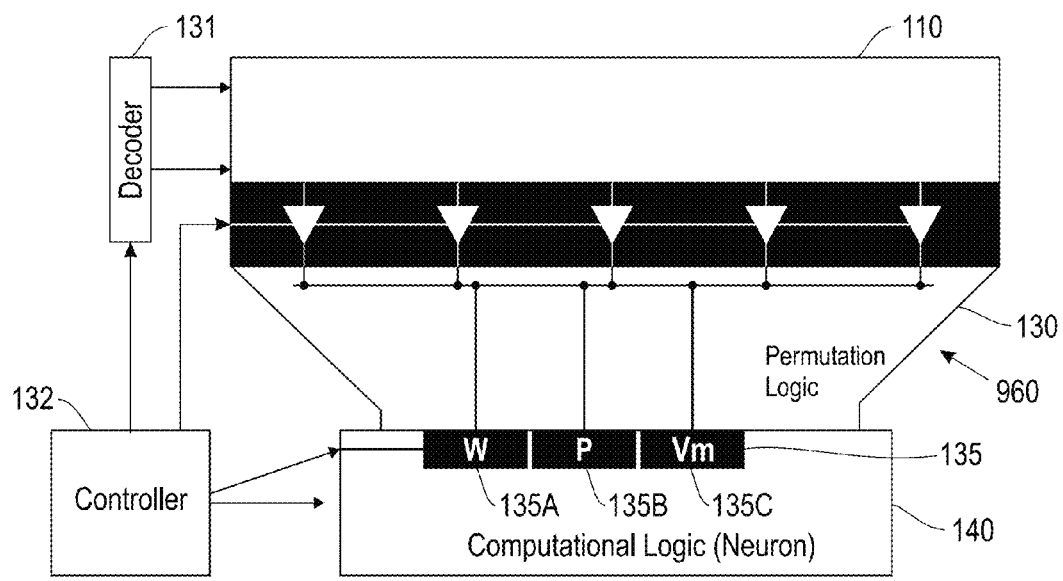
FIG. 15 illustrates an example common bus for the first permutation logic unit, in accordance with an embodiment of the invention.

FIG. 15 illustrates an example common bus 960 for the first permutation logic unit 130, in accordance with an embodiment of the invention. Data is steered and permuted through the common bus 960. Each row 111 of data from the memory block 110 is segmented into multiple data groups 112, wherein each data 112 group is n-bits wide. All the data groups 112 are connected to the common bus 960, but only one data group 112 is activated by the controller 132 at any moment. For example, when a data group 112 is activated, the controller 132 instructs an input register in the first set 135 of input registers to latch the activated data group 112. Data is copied from the memory block 110 until the first set 135 of input registers latches all data necessary for updating a neuronal state of a neuron 11.

Utilizing a common bus 960 requires less circuits and wiring than the steering network 950, but the common bus 960 is slower as it requires sequential transfer of data. Further, unlike the steering network 950, the common bus 960 provides completely arbitrary mapping.

Embodiments of the invention may utilize the steering network 950, the common bus 960, and/or any other method/process for steering data.

Figure 16:
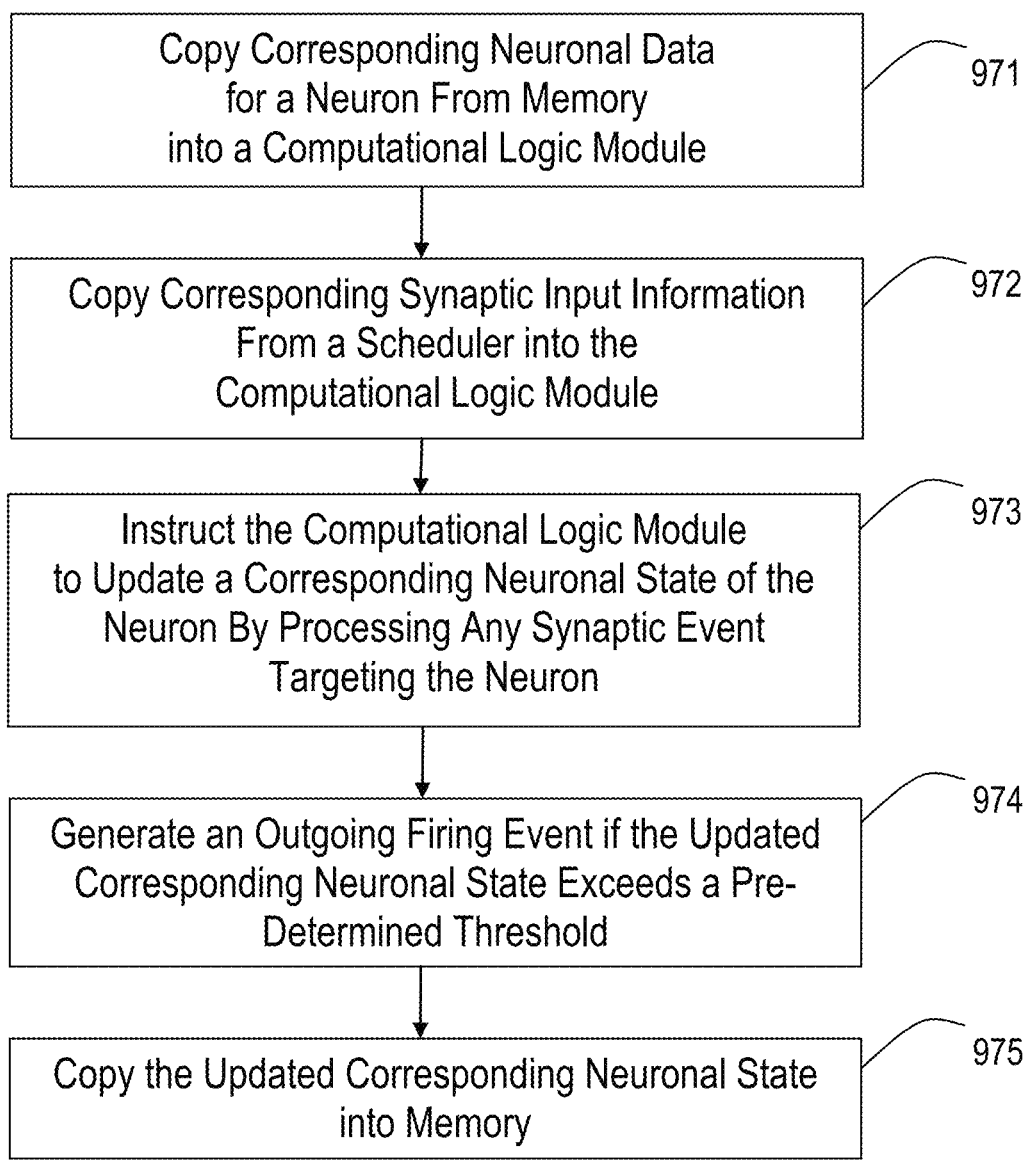
FIG. 16 illustrates a flowchart of an example process for controlling the update of a neuronal state of a neuron, in accordance with an embodiment of the invention.

FIG. 16 illustrates a flowchart of an example process 970 for controlling the update of a neuronal state of a neuron, in accordance with an embodiment of the invention. In process block 971, copy corresponding neuronal data for a neuron from memory block into a computational logic unit. The corresponding neuronal data comprises corresponding synaptic connectivity information, at least one corresponding neuron parameter, and a corresponding neuronal state of the neuron. In process block 972, copy corresponding synaptic input information from a scheduler into the computational logic unit. In process block 973, instruct the computational logic unit to update the corresponding neuronal state by processing any synaptic event targeting the neuron. In process block 974, generate an outgoing firing event if the updated corresponding neuronal state exceeds a pre-determined threshold. In process block 975, copy the updated corresponding neuronal state into memory.

Figure 17:
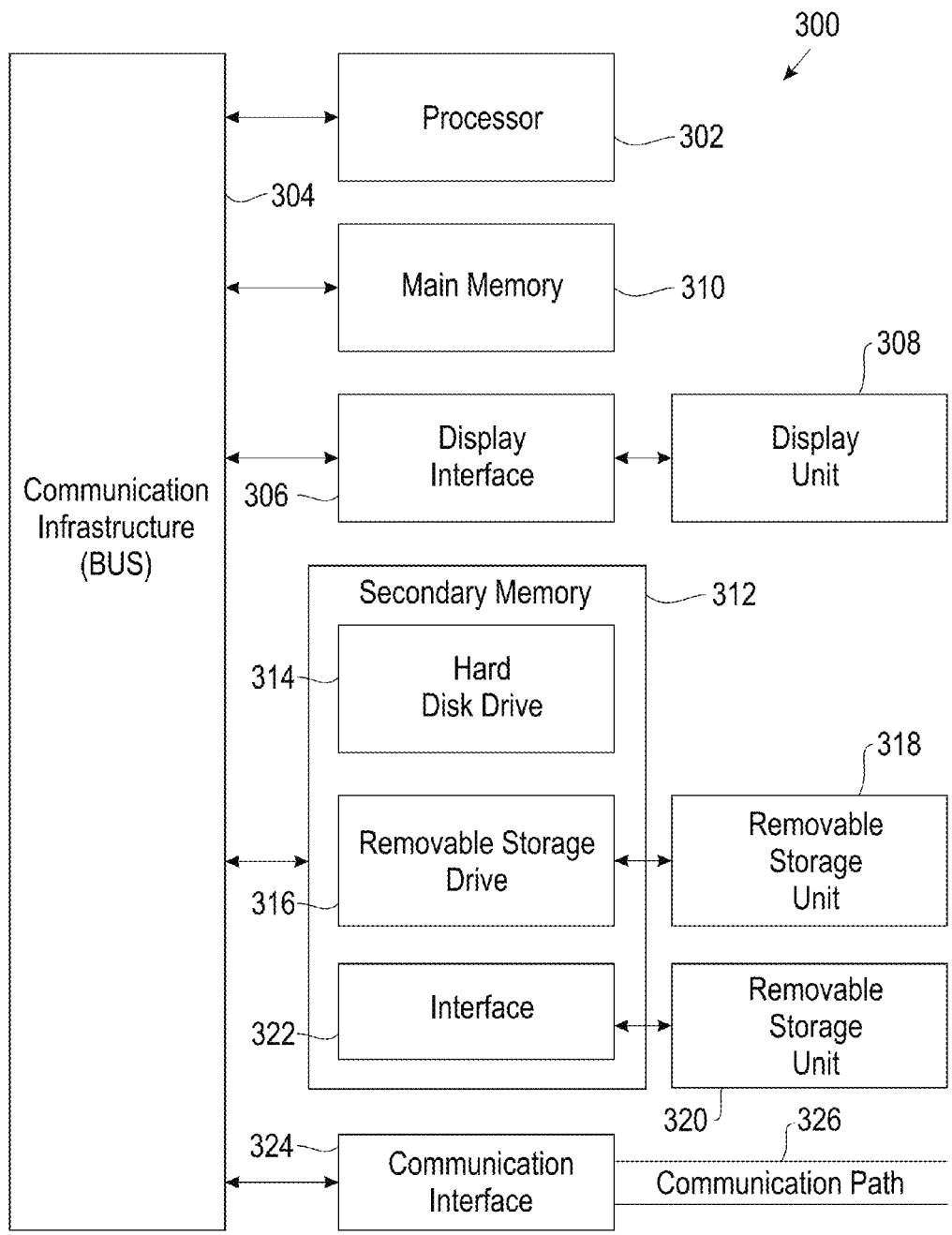
FIG. 17 is a high-level block diagram showing an information processing system useful for implementing one embodiment of the invention.

FIG. 17 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for consolidating multiple neurosynaptic core circuits into one reconfigurable memory block. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network circuit, comprising:
   a memory block partitioned into multiple memory sub-blocks, each memory sub-block corresponding to a core circuit of multiple neurosynaptic core circuits, and each memory sub-block maintaining neuronal data for multiple neurons of a corresponding core circuit;
   a scheduler comprising multiple bit maps, each bit map corresponding to a core circuit of said core circuits, and each bit map indicative of one or more incoming firing events targeting one or more neurons of a corresponding core circuit;
   a computational logic unit comprising a set of input registers, said computational logic unit configured to load neuronal data for multiple neurons of a core circuit from a corresponding memory sub-block of said memory block into said set of input registers, and update said neuronal data in said corresponding memory sub-block by processing a corresponding bit map of said scheduler to integrate one or more incoming firing events targeting one or more neurons of said core circuit; and
   a controller configured to control execution of said computational logic unit and access to said memory block and said scheduler.

2. The neural network circuit of claim 1, wherein:
   said neuronal data comprises synaptic connectivity information, neuron parameters, and neuronal states for said multiple neurons.

3. The neural network circuit of claim 2, wherein:
   said memory block is configurable to maintain said synaptic connectivity information, said neuron parameters, and said neuronal states in different locations of said memory block.

4. The neural network circuit of claim 2, wherein:
   said controller controls a sequence of execution comprising:
   for each neuron:
      copying corresponding synaptic connectivity information, one or more corresponding neuron parameters, and a corresponding neuronal state of said neuron from said memory block to said computational logic unit;
      copying corresponding synaptic input information from said scheduler to said computational logic unit;
      instructing said computational logic unit to update said corresponding neuronal state by processing any synaptic event targeting said neuron;

generating an outgoing firing event if said updated corresponding neuronal state exceeds a pre-determined threshold; and
copying said updated corresponding neuronal state to said memory block.

5. The neural network circuit of claim 4, wherein:
said controller interacts with a routing network for routing and delivering each outgoing firing event generated.

6. The neural network circuit of claim 1, wherein said memory block maintains neuronal data for multiple neurons of multiple neurosynaptic core circuits.

7. The neural network circuit of claim 2, wherein the number of bits allocated to at least one of said synaptic connectivity information, said neuron parameters and said neuronal states is variable.

8. The neural network circuit of claim 5, wherein:
said neuronal data further comprises spike destination information for said multiple neurons; and
said routing network routes and delivers each outgoing firing event generated by each neuron based on corresponding spike destination information for said neuron.

9. A method for consolidating neuronal data for multiple neurons, comprising:
maintaining neuronal information in a memory block partitioned into multiple memory sub-blocks, each memory sub-block corresponding to a core circuit of multiple neurosynaptic core circuits, and each memory sub-block maintaining neuronal data for multiple neurons of a corresponding core circuit;
maintaining incoming firing event information in a scheduler comprising multiple bit maps, each bit map corresponding to a core circuit of said core circuits, and each bit map indicative of one or more incoming firing events targeting one or more neurons of a corresponding core circuit;
updating said neuronal information by processing said incoming firing event information via a computational logic unit comprising a set of input registers, said computational logic unit configured to load neuronal data for multiple neurons of a core circuit from a corresponding memory sub-block of said memory block into said set of input registers, and update said neuronal data in said corresponding memory sub-block by processing a corresponding bit map of said scheduler to integrate one or more incoming firing events targeting one or more neurons of said core circuit; and
controlling, via a controller, execution of said computational logic unit and access to said memory block and said scheduler.

10. The method of claim 9, wherein:
said neuronal data comprises synaptic connectivity information, neuron parameters, and neuronal states for said multiple neurons.

11. The method of claim 10, further comprising:
configuring said memory block to maintain said synaptic connectivity information, said neuron parameters, and said neuronal states in different locations of said memory block.

12. The method of claim 10, further comprising:
controlling a sequence of execution comprising:
for each neuron:
copying corresponding synaptic connectivity information, one or more corresponding neuron parameters, and a corresponding neuronal state of said neuron from said memory block to said computational logic unit;
copying corresponding synaptic input information from said scheduler to said computational logic unit;
instructing said computational logic unit to update said corresponding neuronal state by processing any synaptic event targeting said neuron;
generating an outgoing firing event if said updated corresponding neuronal state exceeds a pre-determined threshold; and
copying said updated corresponding neuronal state to said memory block.

13. The method of claim 12, further comprising:
routing and delivering each outgoing firing event generated via a routing network.

14. The method of claim 9, wherein said memory block maintains neuronal data for multiple neurons of multiple neurosynaptic core circuits.

15. The method of claim 10, wherein the number of bits allocated to at least one of said synaptic connectivity information, said neuron parameters and said neuronal states is variable.

16. The method of claim 13, wherein:
said neuronal data further comprises spike destination information for said multiple neurons; and
said routing network routes and delivers each outgoing firing event generated by each neuron based on corresponding spike destination information for said neuron.

17. A computer program product for consolidating neuronal data for multiple neurons, the computer program product comprising a non-transitory computer-useable storage medium having program code embodied therewith, the program code being executable by a computer to:
maintain neuronal information in a memory block partitioned into multiple memory sub-blocks, each memory sub-block corresponding to a core circuit of multiple neurosynaptic core circuits, and each memory sub-block maintaining neuronal data for multiple neurons of a corresponding core circuit;
maintain incoming firing event information in a scheduler comprising multiple bit maps, each bit map corresponding to a core circuit of said core circuits, and each bit map indicative of one or more incoming firing events targeting one or more neurons of a corresponding core circuit;
update said neuronal information by processing said incoming firing event information via a computational logic unit comprising a set of input registers, said computational logic unit configured to load neuronal data for multiple neurons of a core circuit from a corresponding memory sub-block of said memory block into said set of input registers, and update said neuronal data in said corresponding memory sub-block by processing a corresponding bit map of said scheduler to integrate one or more incoming firing events targeting one or more neurons of said core circuit; and
control, via a controller, execution of said computational logic unit and access to said memory block and said scheduler.

18. The computer program product of claim 17, the program code being further executable by the computer to:
configure said memory block to maintain synaptic connectivity information, neuron parameters, and neuronal states for said multiple neurons in different locations of said memory block.

19. The computer program product of claim 18, the program code being further executable by the computer to:
control a sequence of execution comprising:

for each neuron:
   copying corresponding synaptic connectivity information, one or more corresponding neuron parameters, and a corresponding neuronal state of said neuron from said memory block to said computational logic unit;
   copying corresponding synaptic input information from said scheduler to said computational logic unit;
   instructing said computational logic unit to update said corresponding neuronal state by processing any synaptic event targeting said neuron;
   generating an outgoing firing event if said updated corresponding neuronal state exceeds a pre-determined threshold; and
   copying said updated corresponding neuronal state to said memory block.

20. The computer program product of claim 18, wherein: the number of bits allocated to at least one of said synaptic connectivity information, said neuron parameters and said neuronal states is variable.

* * * * *